(12) United States Patent
Lee et al.

(10) Patent No.: US 9,450,871 B2
(45) Date of Patent: Sep. 20, 2016

(54) DIGITAL BROADCASTING SYSTEM AND METHOD OF PROCESSING DATA

(71) Applicant: LG ELECTRONICS INC., Seoul (KR)

(72) Inventors: Hyoung Gon Lee, Seoul (KR); In Hwan Choi, Gwacheon-si (KR); Kook Yeon Kwak, Anyang-si (KR); Jong Moon Kim, Gwangmyeong-si (KR); Won Gyu Song, Seoul (KR); Byoung Gill Kim, Seoul (KR); Jin Woo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 14/280,301

(22) Filed: May 16, 2014

(65) Prior Publication Data

US 2014/0250485 A1 Sep. 4, 2014

Related U.S. Application Data

(63) Continuation of application No. 12/026,685, filed on Feb. 6, 2008, now Pat. No. 8,934,491.

(60) Provisional application No. 60/900,257, filed on Feb. 7, 2007.

(30) Foreign Application Priority Data

Mar. 20, 2007 (KR) .................. 10-2007-0026905

(51) Int. Cl.
*H04W 4/00* (2009.01)
*H04L 12/801* (2013.01)
*H04L 27/02* (2006.01)
(Continued)

(52) U.S. Cl.
CPC ............... *H04L 47/10* (2013.01); *H04L 27/02* (2013.01); *H04L 47/12* (2013.01); *H04L 47/14* (2013.01); *H04L 47/22* (2013.01); *H04N 21/236* (2013.01)

(58) Field of Classification Search
None
See application file for complete search history.

(56) References Cited

U.S. PATENT DOCUMENTS 5,490,136 A 2/1996 Sereno et al.
6,088,578 A 7/2000 Manning et al.
6,603,752 B1 8/2003 Saifuddin et al.
(Continued)

FOREIGN PATENT DOCUMENTS

KR 10-1998-0081105 A 11/1998
KR 10-2006-0047997 5/2006

OTHER PUBLICATIONS

Korean Intellectual Property Office Application Serial No. 10-2007-0026905, Notice of Allowance dated Sep. 3, 2013, 2 pages.

*Primary Examiner* — Steven H Nguyen
(74) *Attorney, Agent, or Firm* — Dentons US LLP

(57) ABSTRACT

A digital broadcasting system and a method of processing data are disclosed. Herein, additional encoding is performed on mobile service data, which are then transmitted, thereby providing robustness in the processed mobile service data, so that the mobile service data can respond more strongly against fast and frequent channel changes. In a transmitting system including a service multiplexer and a transmitter located in a remote site, a method of processing data of the transmitting system includes comparing an output data rate of the service multiplexer and a transmission data rate of the transmitter, when a difference occurs between the two data rates, adjusting a burst size, wherein the burst transmits mobile service data, and encoding the mobile service data, and referring to the burst size so as to multiplex main service data and the encoded mobile service data in a burst structure.

8 Claims, 13 Drawing Sheets

(51) Int. Cl.
*H04L 12/815* (2013.01)
*H04N 21/236* (2011.01)

(56) References Cited

U.S. PATENT DOCUMENTS

| | | | |
|---|---|---|---|
| 6,647,006 B1 | 11/2003 | Rasanen | |
| 6,754,189 B1 | 6/2004 | Cloutier et al. | |
| 6,782,269 B2 | 8/2004 | Toskala et al. | |
| 7,142,867 B1 | 11/2006 | Gandhi et al. | |
| 7,593,474 B2 | 9/2009 | Jeong et al. | |
| 7,668,261 B2 * | 2/2010 | Paila | 375/326 |
| 7,711,045 B2 | 5/2010 | Park et al. | |
| 7,796,697 B2 * | 9/2010 | Kim et al. | 375/260 |
| 8,045,637 B2 | 10/2011 | Lee et al. | |
| 8,064,543 B2 | 11/2011 | Kim et al. | |
| 8,098,694 B2 | 1/2012 | Kim et al. | |
| 2002/0154611 A1 | 10/2002 | Khullar | |
| 2003/0032389 A1 | 2/2003 | Kim et al. | |
| 2003/0076799 A1 | 4/2003 | Kwak et al. | |
| 2006/0039503 A1 | 2/2006 | Choi et al. | |
| 2006/0246836 A1 * | 11/2006 | Simon | 455/3.01 |
| 2007/0076584 A1 | 4/2007 | Kim et al. | |
| 2007/0091917 A1 * | 4/2007 | Schoenblum | 370/464 |
| 2007/0220405 A1 * | 9/2007 | Arnold et al. | 714/776 |
| 2007/0268979 A1 | 11/2007 | Chang et al. | |
| 2008/0025195 A1 * | 1/2008 | Yang et al. | 370/203 |
| 2008/0028280 A1 * | 1/2008 | Ver Steeg | 714/776 |
| 2008/0170531 A1 * | 7/2008 | Petry et al. | 370/312 |
| 2008/0192777 A1 * | 8/2008 | Choi et al. | 370/539 |
| 2010/0195712 A1 * | 8/2010 | Yu et al. | 375/240.01 |

* cited by examiner

DIGITAL BROADCASTING SYSTEM AND METHOD OF PROCESSING DATA

CROSS-REFERENCE TO RELATED APPLICATIONS

This application is a continuation of U.S. application Ser. No. 12/026,685, filed on Feb. 6, 2008, currently pending, which claims the benefit of earlier filing date and right of priority to Korean Patent Application No. 10-2007-0026905, filed on Mar. 20, 2007, and also claims the benefit of U.S. Provisional Application Ser. No. 60/900,257, filed on Feb. 7, 2007, the contents of which are all hereby incorporated by reference herein in their entirety.

BACKGROUND OF THE INVENTION

1. Field of the Invention

The present invention relates to a digital broadcasting system and a method of processing data.

2. Discussion of the Related Art

The Vestigial Sideband (VSB) transmission mode, which is adopted as the standard for digital broadcasting in North America and the Republic of Korea, is a system using a single carrier method. Therefore, the receiving performance of the receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a digital broadcasting system and a method of processing data that substantially obviate one or more problems due to limitations and disadvantages of the related art.

An object of the present invention is to provide a digital broadcasting system and a method of processing data that are highly resistant to channel changes and noise.

Another object of the present invention is to provide a digital broadcasting system and a method of processing data that can enhance the receiving performance by performing additional encoding on mobile service data and by transmitting the processed data to the receiving system.

A further object of the present invention is to provide a digital broadcasting system and a method of processing data that can match data rates of a service multiplexer and a transmitter by adjusting the data rate of the transmitter, when a difference occurs between the data rate of the service multiplexer and the data rate of the transmitter.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a transmitting system including a service multiplexer and a transmitter located in a remote site, a method of processing data of the transmitting system includes comparing an output data rate of the service multiplexer and a transmission data rate of the transmitter, when a difference occurs between the two data rates, adjusting a burst size, wherein the burst transmits mobile service data, and encoding the mobile service data, and referring to the burst size so as to multiplex main service data and the encoded mobile service data in a burst structure.

In another aspect of the present invention, in a transmitting system including a service multiplexer and a transmitter located in a remote site, a method of processing data of the transmitting system includes comparing an output data rate of the service multiplexer and a transmission data rate of the transmitter, when a difference occurs between the two data rates, adjusting a burst period, wherein the burst transmits mobile service data, and encoding the mobile service data, and referring to the burst period so as to multiplex main service data and the encoded mobile service data in a burst structure.

In another aspect of the present invention, in a transmitting system including a service multiplexer and a transmitter located in a remote site, a method of processing data of the transmitting system includes comparing an output data rate of the service multiplexer and a transmission data rate of the transmitter, when a difference occurs between the two data rates, inserting or removing transmission null data in or from mobile service data, so as to adjusting the data rate, encoding the processed mobile service data, the mobile service data having the transmission null data inserted therein or removed therefrom, and multiplexing main service data and the encoded mobile service data in a burst structure.

In another aspect of the present invention, a service multiplexer of a transmitting system includes a mobile service multiplexer, a null packet generator, and a transport packet multiplexer. The mobile service multiplexer multiplexes at least one mobile service data type, PSI/PSIP tables for mobile service, and space-filler null data at a predetermined first data rate and outputs the multiplexed data. The null packet generator generates space-filler null data, so as to match an output data rate of the mobile service data multiplexer at the first data rate, and outputs the generated space-filler null data to the mobile service multiplexer. The transport packet multiplexer multiplexes at least one main service data type and PSI/PSIP tables for main service at a predetermined second data rate, and multiplexes the data outputted from the mobile service multiplexer at a predetermined third data rate, thereby outputting the multiplexed data to a transmitter located at a remote site.

In a further aspect of the present invention, a transmitter of a transmitting system includes a demultiplexer, a buffer, a pre-processor, a buffer controller, and a packet multiplexer. The demultiplexer receives data transmitted from a service multiplexer at a predetermined data rate, thereby identifying mobile service data, main service data, and space-filler null data. The buffer temporarily stores the mobile service identified by the demultiplexer and outputs the temporarily stored data. The pre-processor encodes the data outputted from the buffer. The buffer controller monitors input and output data rates of the buffer, thereby adjusting transmission parameters associated with a burst for transmitting mobile service data, when a difference between the two data rates occurs. And, the packet multiplexer refers to the transmission parameters, thereby multiplexing the mobile service data packet and a main service data packet including main service data in a burst structure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
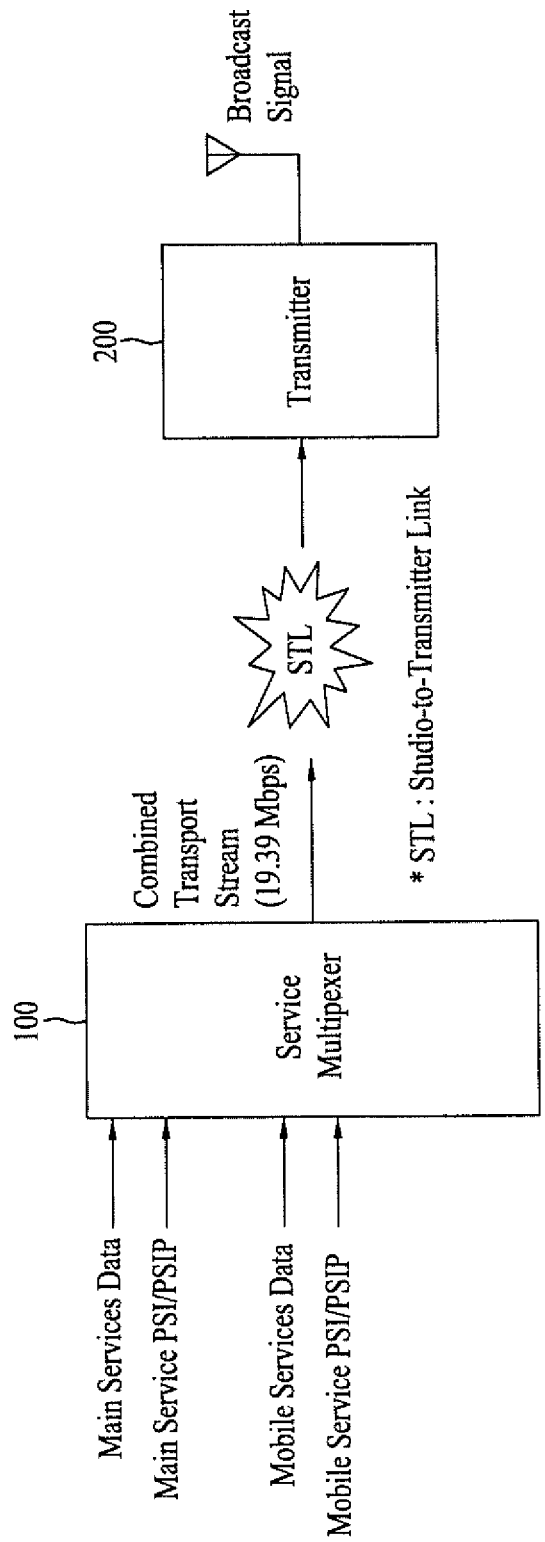
FIG. 1 illustrates a block diagram showing a general structure of a transmitting system according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system. Additionally, in the present invention, mobile service data may include at least one of mobile service data, pedestrian service data, and handheld service data, and are collectively referred to as mobile service data for simplicity. Herein, the mobile service data not only correspond to mobile/pedestrian/handheld service data (M/P/H service data) but may also include any type of service data with mobile or portable characteristics. Therefore, the mobile service data according to the present invention are not limited only to the M/P/H service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be serviced as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above. In the present invention, the transmitting system provides backward compatibility in the main service data so as to be received by the conventional receiving system. Herein, the main service data and the mobile service data are multiplexed to the same physical channel and then transmitted.

Additionally, the transmitting system according to the present invention performs additional encoding on the mobile service data and inserts the data already known by the receiving system and transmitting system (e.g., known data), thereby transmitting the processed data. Therefore, when using the transmitting system according to the present invention, the receiving system may receive the mobile service data during a mobile state and may also receive the mobile service data with stability despite various distortion and noise occurring within the channel. Furthermore, when a difference occurs between the data rate of the service multiplexer within the transmitting system and the data rate of the transmitter, the transmitter may adjust its data rate. Particularly, when a difference occurs between the data rate of the mobile service data outputted from the service multiplexer and the data rate of the data transmitted from the transmitter, the transmitter is capable of adjusting (or controlling) the difference in data rates.

FIG. 1 illustrates a block diagram showing a general structure of a transmitting system according to an embodiment of the present invention. Herein, the transmitting includes a service multiplexer 100 and a transmitter 200. Herein, the service multiplexer 100 is located in the studio of each broadcast station, and the transmitter 200 is located in a site placed at a predetermined distance from the studio. The transmitter 200 may be located in a plurality of different locations. Also, for example, the plurality of transmitters may share the same frequency. And, in this case, the plurality of transmitters receives the same signal. This corresponds to a data transmission using a single frequency network (SFN). Accordingly, in the receiving system, a channel equalizer may compensate signal distortion, which is caused by a reflected wave, so as to recover the original signal. In another example, the plurality of transmitters may have different frequencies with respect to the same channel. This corresponds to a data transmission using a multiple frequency network (MFN).

A variety of methods may be used for data communication among each of the transmitters, which are located in remote positions, and the service multiplexer. For example, an interface standard such as a synchronous serial interface for transport of MPEG-2 data (SMPTE-310M). In the SMPTE-310M interface standard, a constant data rate is decided as an output data rate of the service multiplexer. For example, in case of the 8VSB mode, the output data rate is 19.39 Mbps, and, in case of the 16VSB mode, the output data rate is 38.78 Mbps. Furthermore, in the conventional 8VSB mode transmitting system, a transport stream (TS) packet having a data rate of approximately 19.39 Mbps may be transmitted through a single physical channel. Also, in the transmitting system according to the present invention provided with backward compatibility with the conventional transmitting system, additional error correction encoding is performed on the mobile service data. Thereafter, the additionally encoded mobile service data are multiplexed with the main service data to a TS packet form, which is then transmitted. At this point, the data rate of the multiplexed TS packet is approximately 19.39 Mbps.

At this point, the service multiplexer 100 receives at least one type of main service data and program specific information/program and system information protocol (PST/PSIP) table data for each main service so as to encapsulate the received data to a TS packet, respectively. Also, the service multiplexer 100 receives at least one type of mobile service data and PSI/PSIP table data for each mobile service and encapsulates the received data to transport stream (TS) packets. Subsequently, the TS packets are multiplexed according to a predetermined multiplexing rule and outputs the multiplexed packets to the transmitter 200.

Figure 2:
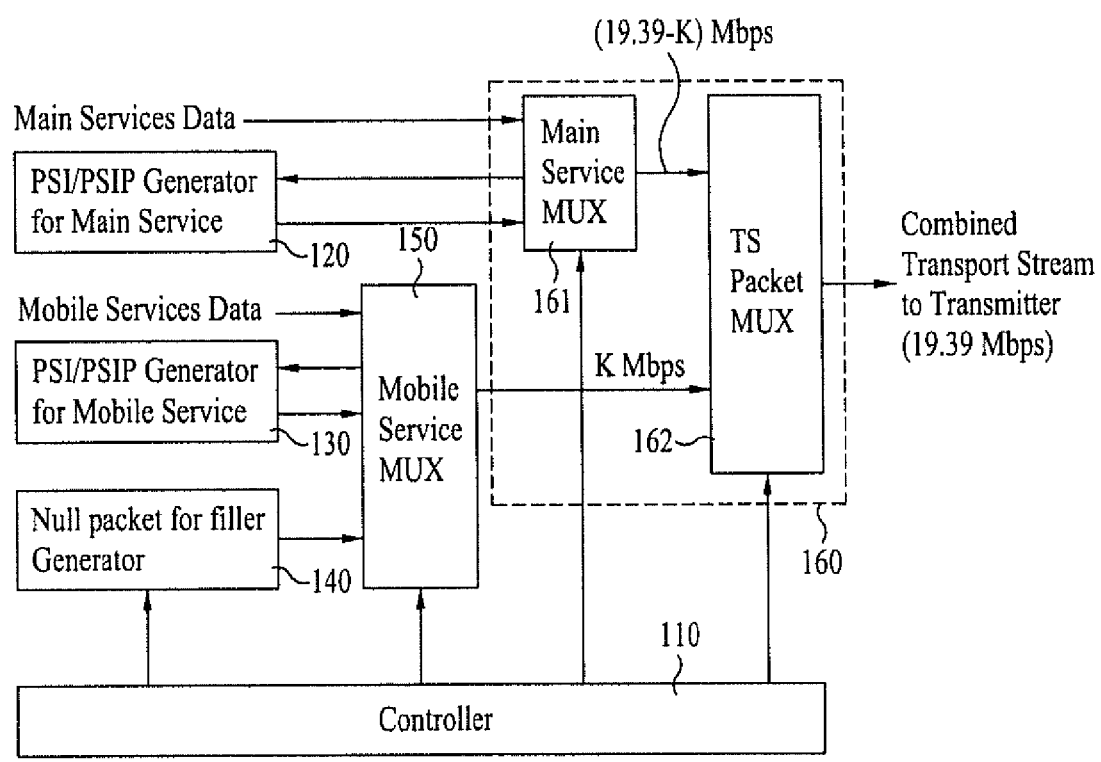
FIG. 2 illustrates a block diagram showing an example of a service multiplexer of FIG. 1.

FIG. 2 illustrates a block diagram showing an example of the service multiplexer 100. The service multiplexer 100 includes a controller 110 controlling the overall operations of the service multiplexer, a main service PSI/PSIP generator 120, a mobile service PSI/PSIP generator 130, a null packet generator 140, a mobile service multiplexer 150, and a transport multiplexer 160. The transport multiplexer 160 may include a main service multiplexer 161 and a transport stream (TS) packet multiplexer 162. Referring to FIG. 2, at least one type of compression encoded main service data and the PSI/PSIP table data generated from the main service PSI/PSIP generator 120 are inputted to the main service multiplexer 161 of the transport multiplexer 160. The main service multiplexer 161 encapsulates each of the inputted main service data and PSI/PSIP table data to MPEG-2 TS packet forms. Then, the MPEG-2 TS packets are multiplexed and outputted to the TS packet multiplexer 162. Herein, the data packet being outputted from the main service multiplexer 161 will be referred to as a main service data packet for simplicity.

Thereafter, at least one type of the compression encoded mobile service data and the PSI/PSIP table data generated from the mobile service PSI/PSIP generator 130 are inputted to the mobile service multiplexer 150. At this point, the PSI/PSIP tables for mobile service may include at least one transmission parameter corresponding to each mobile service. In this case, based upon the control of the mobile service multiplexer 150, the PSI/PSIP generator 130 generates the transmission parameters. Then, the generated transmission parameters may be included in the corresponding table within PSI/PSIP tables pre-arranged with the transmitter 200, thereby outputted to the mobile service multiplexer 150. The mobile service multiplexer 150 encapsulates each of the inputted mobile service data and PSI/PSIP table data to MPEG-2 TS packet forms. Then, the MPEG-2 TS packets are multiplexed and outputted to the TS packet multiplexer 162. Herein, the data packet being outputted from the mobile service multiplexer 150 will be referred to as a mobile service data packet for simplicity.

At this point, the transmitter 200 requires identification information in order to identify and process the main service data packet and the mobile service data packet. Herein, the identification information may use values pre-decided in accordance with an agreement between the transmitting system and the receiving system, or may be configured of a separate set of data, or may modify a predetermined location value within the corresponding data packet. Herein, any value that can identify each data packet may be used as the identification information. Therefore, the present invention is not limited only to the examples set forth in the description of the present invention.

As an example of the present invention, a different packet identifier (PID) may be assigned (or allocated) to identify each of the main service data packet and the mobile service data packet. In another example, by modifying a synchronization data byte within a header of the mobile service data, the service data packet may be identified by using the synchronization data byte value of the corresponding service data packet. For example, the synchronization byte of the main service data packet directly outputs the value decided by the ISO/IEC13818-1 standard (i.e., 0x47) without any modification. The synchronization byte of the mobile service data packet modifies and outputs the value, thereby identifying the main service data packet and the mobile service data packet. Conversely, the synchronization byte of the main service data packet is modified and outputted, whereas the synchronization byte of the mobile service data packet is directly outputted without being modified, thereby enabling the main service data packet and the mobile service data packet to be identified.

A plurality of methods may be applied in the method of modifying the synchronization byte. For example, each bit of the synchronization byte may be inversed, in other words, bitwise inversion may be performed, or only a portion of the synchronization byte may be inversed. As described above, any value that can be used to identify the main service data packet and the mobile service data packet may be used herein as the identification information. Therefore, the scope of the present invention is not limited only to the example set forth in the description of the present invention.

Meanwhile, a transport multiplexer used in the conventional digital broadcasting system may be used as the transport multiplexer 160 according to the present invention. More specifically, in order to multiplex the mobile service data and the main service data and to transmit the multiplexed data, the data rate of the main service is limited to a data rate of (19.39-K) Mbps. Then, K Mbps, which corresponds to the remaining data rate, is assigned as the data rate of the mobile service. Thus, the transport multiplexer which is already being used may be used as it is without any modification. Herein, the transport multiplexer 160 multiplexes the main service data packet being outputted from the main service multiplexer 161 and the mobile service data packet being outputted from the mobile service multiplexer 150. Thereafter, the transport multiplexer 160 transmits the multiplexed data packets to the transmitter 200.

However, in some cases, the output data rate of the mobile service multiplexer 150 may not be equal to K Mbps. In this case, the mobile service multiplexer 150 multiplexes and outputs null data packets generated from the null packet generator 140, so that the output data rate can be adjusted to K Mbps. More specifically, the null packet generator 140 generates null data packets in order to set the output data rate of the mobile service multiplexer 150 to a constant data rate. Then, the null packet generator 140 outputs the multiplexed null data packets to the mobile service multiplexer 150. Herein, the null data packets generated from the null packet generator 140 will be referred to as space-filler null data packets (or null data packets for filler) for simplicity.

For example, when the service multiplexer 100 assigns K Mbps of the 19.39 Mbps to the mobile service data, and when the remaining (19.39-K) Mbps is, therefore, assigned to the main service data, the data rate of the mobile service data that are multiplexed by the service multiplexer 100 actually becomes lower than K Mbps. This is because the pre-processor of the transmitter 200 performs additional encoding on the mobile service data, thereby increasing the amount of data. Eventually, the data rate of the mobile service data, which may be transmitted from the service multiplexer 100, becomes smaller than K Mbps.

For example, since the pre-processor of the transmitter 200 performs an encoding process on the mobile service data at a coding rate of at least ½, the amount of the data outputted from the pre-processor is increased to more than twice the amount of the data initially inputted to the pre-processor. Accordingly, the sum of the data rate of the main service data and the data rate of the mobile service data, both being multiplexed by the service multiplexer 100, becomes smaller than or equal to 19.39 Mbps. Therefore, in order to match the data rate of the data that are finally outputted from the service multiplexer 100 to a constant data rate (e.g., 19.39 Mbps), an amount of null data packets corresponding to the amount of lacking data rate is generated from the null packet generator 140 and outputted to the mobile service multiplexer 150.

Accordingly, the mobile service multiplexer 150 encapsulates each of the mobile service data and the PSI/PSIP table data that are being inputted to a MPEG-2 TS packet form. Then, the above-described TS packets are multiplexed with the space-filler null data packets and, then, outputted to the TS packet multiplexer 162. Thereafter, the transport multiplexer 160 multiplexes the main service data packet being outputted from the main service multiplexer 161 and the mobile service data packet being outputted from the mobile service multiplexer 150 and transmits the multiplexed data packets to the transmitter 200 at a data rate of 19.39 Mbps.

According to an embodiment of the present invention, the mobile service multiplexer 150 receives the space-filler null data packets. However, this is merely exemplary and does not limit the scope of the present invention. In other words, according to another embodiment of the present invention, the TS packet multiplexer 162 may receive the space-filler null data packets, so as to match the data rate of the final output data to a constant rate. Herein, the output path and multiplexing rule of the space-filler null data packets is controlled by the controller 110. The controller 110 controls the multiplexing processes performed by the mobile service multiplexer 150, and the main service multiplexer 161 and TS packet multiplexer 162 of the transport multiplexer 160, and also controls the space-filler null data packet generation of the null packet generator 140. At this point, the transmitter 200 discards the space-filler null data packets transmitted from the service multiplexer 100 instead of transmitting the space-filler null data packets.

Further, in order to allow the transmitter 200 to discard the space-filler null data packets transmitted from the service multiplexer 100 instead of transmitting them, identification information for identifying the space-filler null data packets is required. Herein, the identification information may use values pre-decided in accordance with an agreement between the transmitting system and the receiving system. For example, the value of the synchronization byte within the header of the null data packet may be modified so as to be used as the identification information. Alternatively, a transport_error_indicator flag may also be used as the identification information. Herein, any information that can identify the space-filler null data packets may be used as the identification information. Therefore, the present invention will not be limited only to the example set forth in the description of the present invention.

In the description of the present invention, an example of using the transport_error_indicator flag included in the header of the space-filler null data packets as the identification information will be given to describe an embodiment of the present invention. In this case, the transport_error_indicator flag of the space-filler null data packet is set to '1', and the transport_error_indicator flag of the remaining data packets are reset to '0', so as to identify the space-filler null data packet. More specifically, when the null packet generator 140 generates the space-filler null data packets, and if the transport_error_indicator flag from the header field of the corresponding space-filler null data packet is set to '1' and then transmitted, the space-filler null data packet may be identified and, therefore, be discarded.

Figure 3:
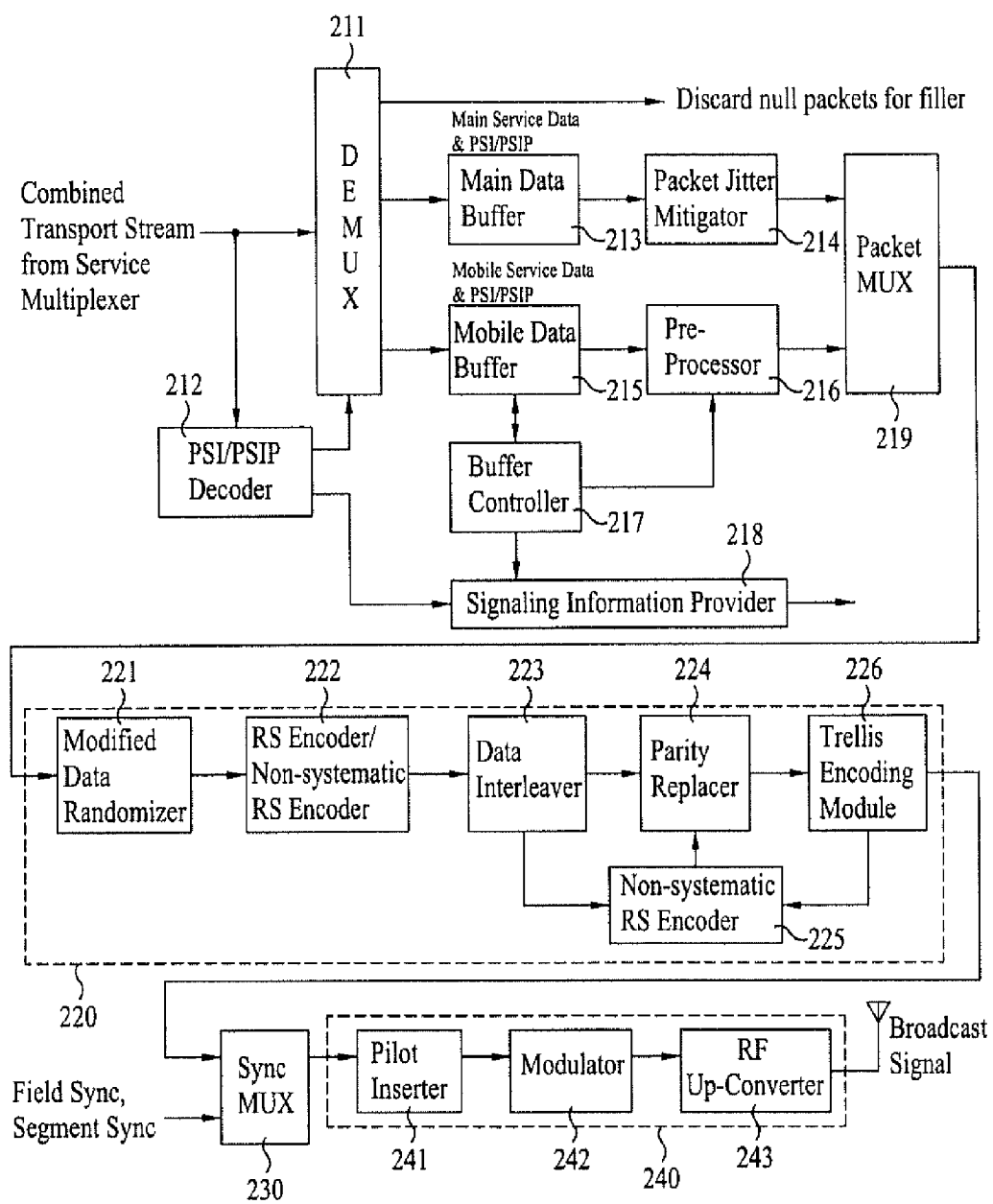
FIG. 3 illustrates a block diagram showing an example of a transmitter of FIG. 1.

FIG. 3 illustrates a block diagram showing the structure of the transmitter 200 according to an embodiment of the present invention. Referring to FIG. 3, the transmitter 200 includes a demultiplexer 211, a PSI/PSIP decoder 212, a main data buffer 213, a packet jitter mitigator 214, a mobile data buffer 215, a pre-processor 216, a buffer controller 217, a signaling information provider 218, a packet multiplexer 219, a post-processor 220, a synchronization (or sync) multiplexer 230, and a transmission unit 240. Herein, the data packet transmitted from the service multiplexer 100 is inputted to the demultiplexer 211 and the PSI/PSIP decoder 212. Based upon the control of the PSI/PSIP decoder 212, the demultiplexer 211 determines (or identifies) whether the received data packet corresponds to a space-filler null data packet, a main service data packet, or a mobile service data packet. The space-filler null data packet identified by the demultiplexer 211 is discarded instead of being transmitted. On the other hand, the main service data packet identified by the demultiplexer 211 passes through the main data buffer 213 so as to be provided to the packet jitter mitigator 214. And, the mobile service data packet identified by the demultiplexer 211 passes through the mobile data buffer 215 so as to be provided to the pre-processor 216.

At this point, a variety of methods may be used by the demultiplexer 211 for identifying the space-filler null data packet, the main service data packet, and the mobile service data packet. For example, the demultiplexer 211 may identify the main service data and the mobile service data based upon the PID value corresponding to the inputted data packet. And, the demultiplexer 211 may identify the space-filler null data packet based upon the value of the transport_error_indicator flag field. Among the data being transmitted from the service multiplexer 100, the PSI/PSIP decoder 212 receives PSI/PSIP tables for main service and PSI/PSIP tables for mobile service so as to respectively recognize the configurations of main service programs and mobile service programs.

Furthermore, the PSI/PSIP decoder 212 may refer to the PID and transport_error_indicator flag field of the data packet that is currently being inputted, thereby generating a control signal, which is capable of determining (or identifying) the inputted data packet as the main service data packet, the mobile service data packet, or the space-filler null data packet. Thereafter, the PSI/PSIP decoder 212 outputs the generated control signal to the demultiplexer 211. Accordingly, the demultiplexer 211 identifies the inputted data packet based upon the received control signal, thereby discarding the identified data packet or outputting the identified data packet to the corresponding block. At this point, the PSI/PSIP tables for mobile service may include at least one transmission parameter for each mobile service. In this case, the PSI/PSIP decoder 212 parses the corresponding transmission parameter and outputs the parsed transmission parameter to the signaling information provider 218. Based upon the control of the buffer controller 217, the signaling information provider 218 provides signaling information including the transmission parameter to blocks associated with the transmitter 200 (e.g., the pre-processor, the packet multiplexer, etc.) so that the corresponding blocks can use the respective transmission parameters.

For example, the transmission may include data group information, information on a region within a data group, RS frame information, super frame information, burst information, turbo code information, RS code information, and so on. Additionally, the burst information may include burst size information and burst period information. The burst period refers to a cycle period during which a burst transmitting the same mobile service type is repeated. And, the burst size indicates the number of data groups included in a burst. The data group may include a plurality of mobile service data packets. Herein, a plurality of such data groups is gathered (or grouped) to form a burst. The burst section represents a beginning (or starting) point of a current burst up to a beginning point of the next burst.

The burst section may be divided into a section including a data group (i.e., a burst-on section) and a section not including any data group (i.e., a burst-off section). A burst section is configured of a plurality of fields, wherein one field includes one data group. The information included in the transmission parameter are merely examples presented to facilitate the understanding of the present invention. And, the addition or deleting of the information included in the transmission parameter may be easily modified by anyone skilled in the art. Therefore, the present invention will not be limited only to the examples set forth herein.

At this point, the transmission parameter provided by the signaling information provider 218 may be varied based upon the control of the buffer controller 217. For example, the burst size and the burst period may be varied. Furthermore, the signaling information outputted from the signaling information provider 218 includes the transmission parameter. The pre-processor 216 performs additional encoding on the mobile service data, so that the mobile service data can respond more effectively to noise and channel environment that undergoes frequent changes. Thereafter, the pre-processor 216 outputs the additionally encoded mobile service data to the packet multiplexer 219.

Figure 4:
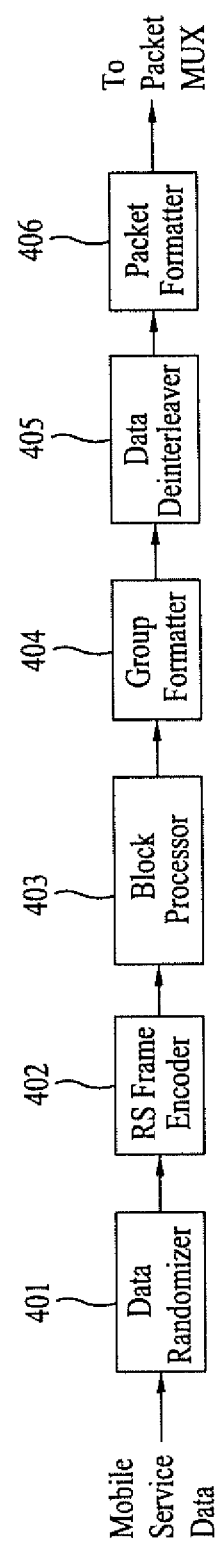
FIG. 4 illustrates a block diagram showing an example of a pre-processor of FIG. 3.

FIG. 4 illustrates a block diagram of the pre-processor 216 according to an embodiment of the present invention. Herein, the pre-processor 216 includes a data randomizer 401, a RS frame encoder 402, a block processor 403, a group formatter 404, a data deinterleaver 405, and a packet formatter 406. The pre-processor 216 according to the embodiment of the present invention refers to the transmission parameter provided by the signaling information provider 218, thereby performing additional encoding on the mobile service data outputted from the mobile data buffer 215. More specifically, the data randomizer 401 receives mobile service data and randomizes the received mobile service data, thereby outputting the processed data to the RS frame encoder 402. At this point, by having the data randomizer 401 randomize the mobile service data, a later randomizing process on the mobile service data performed by the data randomizer 221 of the post-processor 220 may be omitted.

The RS frame encoder 402 groups a plurality of the received mobile service data packets that have been randomized. Then, the RS frame encoder 402 performs at least one of an error correction encoding process and an error detection encoding process on the received randomized mobile service data. Furthermore, the RS frame encoder 402 may also group a plurality of RS frames so as to configure a super frame, thereby performing interleaving (or permutation) processes in super frame units. Thus, by providing robustness on the mobile service data, the corresponding data may be able to respond to the severely vulnerable and frequently changing frequency environment.

More specifically, when the RS frame encoder 402 performs row permutation based upon a predetermined rule for permuting each row of the super frame, the row positions within the super frame after the row permutation process may differ from the row positions within the super frame prior to the row permutation (or interleaving) process. Herein, by performing the row permutation (or interleaving) process in super frame units, even though the section having a plurality of errors occurring therein becomes very long, and even though the number of errors included in the RS frame that is to be decoded exceeds the extent of being able to be corrected, the errors become dispersed within the entire super frame. Thus, the decoding ability is even more enhanced as compared to a single RS frame.

In the RS frame encoder 402 according to the embodiment of the present invention, RS encoding is applied as the error correction encoding process, and cyclic redundancy check (CRC) encoding is applied as the error detection encoding process. When performing RS encoding, parity data that are to be used for error correction are generated. And, when performing CRC encoding, CRC data that are to be used for error detection are generated. Also, according to the embodiment of the present invention, the RS encoding uses the forward error correction (FEC) structure. The FEC corresponds to a technique for compensating errors that occur during the transmission process. The CRC data generated by CRC encoding may be used for indicating whether or not the mobile service data have been damaged by the errors while being transmitted through the channel. In the present invention, a variety of error detection coding methods other than the CRC encoding method may be used, or the error correction coding method may be used to enhance the overall error correction ability (or performance) of the receiving system.

Herein, the RS frame encoder 402 refers to the preset transmission parameter and/or refers to the transmission parameter provided from the signaling information provider 218, thereby being able to perform processes including RS frame configuration, RS encoding, CRC encoding, super frame configuration, and row permutation (or interleaving) in super frame units. As described above, the mobile service data encoded by the RS frame encoder 402 are inputted to the block processor 403. The block processor 403 then encodes the inputted mobile service data at a coding rate of G/H (wherein, G is smaller than H (i.e., G<H)) and then outputted to the group formatter 404.

More specifically, the block processor 403 divides the mobile service data being inputted in byte units into bit units. Then, the G number of bits is encoded to H number of bits. Thereafter, the encoded bits are converted back to byte units and then outputted. For example, if 1 bit of the input data is coded to 2 bits and outputted, then G is equal to 1 and H is equal to 2 (i.e., G=1 and H=2). Alternatively, if 1 bit of the input data is coded to 4 bits and outputted, then G is equal to 1 and H is equal to 4 (i.e., G=1 and H=4). Hereinafter, the former coding rate will be referred to as a coding rate of ½ (½-rate coding), and the latter coding rate will be referred to as a coding rate of ¼ (¼-rate coding), for simplicity.

Herein, when using the ¼ coding rate, the coding efficiency is greater than when using the ½ coding rate, and may, therefore, provide greater and enhanced error correction ability. For such reason, when it is assumed that the data encoded at a ¼ coding rate in the group formatter 404, which is located near the end portion of the system, are allocated to a region in which the receiving performance may be deteriorated, and that the data encoded at a ½ coding rate are allocated to a region having excellent receiving performance, the difference in performance may be reduced.

At this point, the block processor 403 may also receive signaling information including the transmission parameters. Herein, the signaling information is also encoded at the coding rate of ½ or the coding rate of ¼, which is similarly processed as in the step for encoding the mobile service data. Afterwards, the signaling information is considered and treated identically as the mobile service data. Meanwhile, the group formatter 404 inserts mobile service data that are outputted from the block processor 403 in corresponding regions within a data group, which is configured in accordance with a pre-defined rule. Also, with respect to the data deinterleaving process, each place holder or known data are also inserted in corresponding regions within the data group. At this point, the data group may be divided into at least one hierarchical region. Herein, the type of mobile service data being inserted to each region may vary depending upon the characteristics of each hierarchical region. For example, each region may be divided based upon the receiving performance within the data group.

In an example given in the present invention, a data group is divided into A, B, and C regions in a data configuration prior to data deinterleaving. At this point, the group formatter 404 allocates the mobile service data, which are inputted after being RS encoded and block encoded, to each of the corresponding regions by referring to the transmission parameter.

Figure 5:
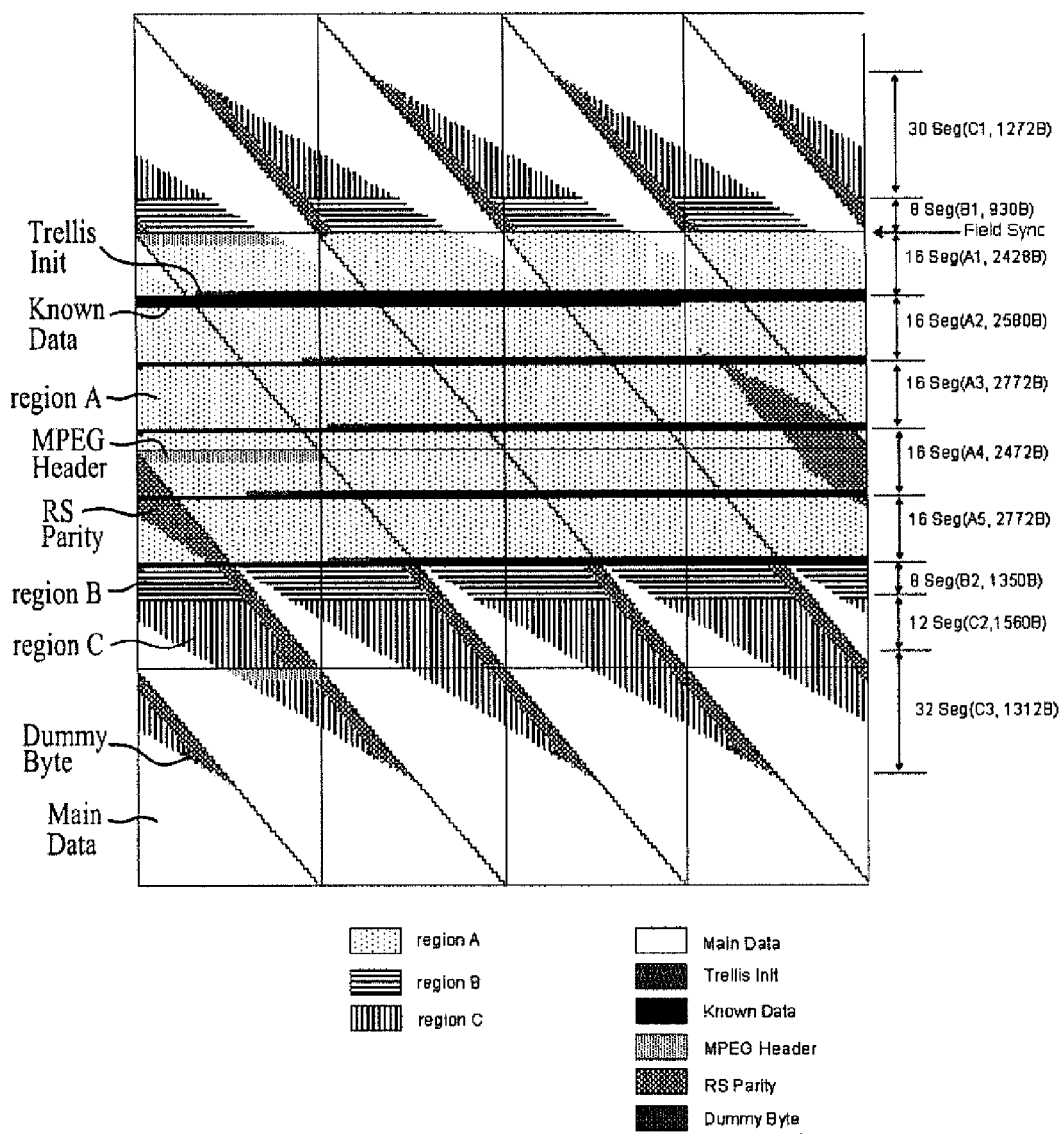
FIG. 5 and FIG. 6 illustrate data configuration before and after a data deinterleaver in a transmitting system according to the present invention.
Figure 6:
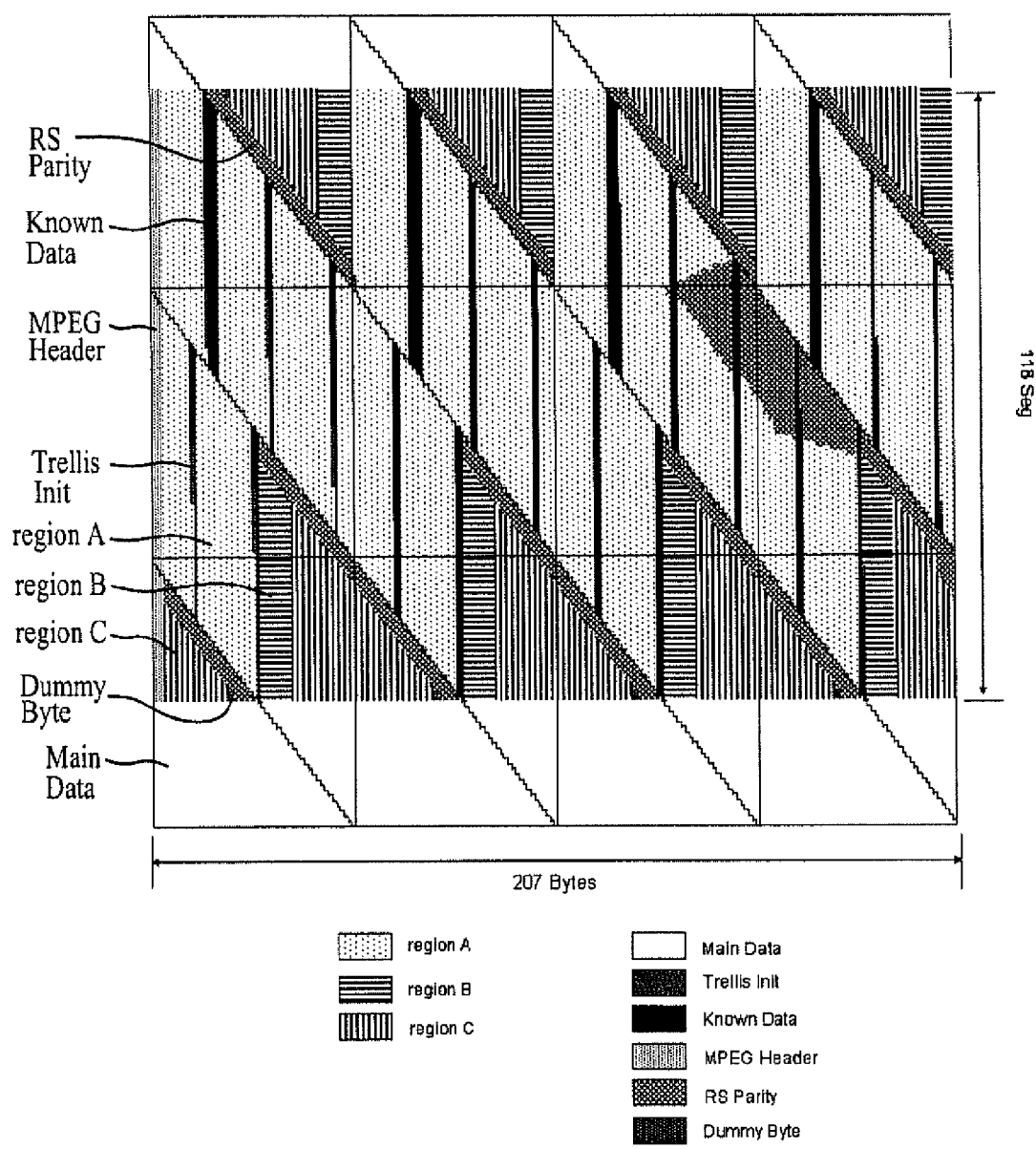

FIG. 5 illustrates an alignment of data after being data interleaved and identified, and FIG. 6 illustrates an alignment of data before being data interleaved and identified.

More specifically, a data structure identical to that shown in FIG. 5 is transmitted to a receiving system. Also, the data group configured to have the same structure as the data structure shown in FIG. 5 is inputted to the data deinterleaver 405.

As described above, FIG. 5 illustrates a data structure prior to data deinterleaving that is divided into 3 regions, such as region A, region B, and region C. Also, in the present invention, each of the regions A to C is further divided into a plurality of regions. Referring to FIG. 5, region A is divided into 5 regions (A1 to A5), region B is divided into 2 regions (B1 and B2), and region C is divided into 3 regions (C1 to C3). Herein, regions A to C are identified as regions having similar receiving performances within the data group. Herein, the type of mobile service data, which are inputted, may also vary depending upon the characteristic of each region.

In the example of the present invention, the data structure is divided into regions A to C based upon the level of interference of the main service data. Herein, the data group is divided into a plurality of regions to be used for different purposes. More specifically, a region of the main service data having no interference or a very low interference level may be considered to have a more resistant (or robust) receiving performance as compared to regions having higher interference levels. Additionally, when using a system inserting and transmitting known data in the data group, and when consecutively long known data are to be periodically inserted in the mobile service data, the known data having a predetermined length may be periodically inserted in the region having no interference from the main service data (e.g., region A). However, due to interference from the main service data, it is difficult to periodically insert known data and also to insert consecutively long known data to a region having interference from the main service data (e.g., region B and region C).

Hereinafter, examples of allocating data to region A (A1 to A5), region B (B1 and B2), and region C (C1 to C3) will now be described in detail with reference to FIG. 5. The data group size, the number of hierarchically divided regions within the data group and the size of each region, and the number of mobile service data bytes that can be inserted in each hierarchically divided region of FIG. 5 are merely examples given to facilitate the understanding of the present invention. Herein, the group formatter 404 creates a data group including places in which field synchronization data bytes are to be inserted, so as to create the data group that will hereinafter be described in detail.

More specifically, region A includes A2 to A5 regions within the data group in which a long known data sequence may be periodically inserted, and in which includes regions wherein the main service data are not mixed. Also, region A includes an A1 region located between a field synchronization region and the region in which the first known data sequence is to be inserted. The field synchronization region has the length of one segment (i.e., 832 symbols) existing in an ATSC system.

For example, referring to FIG. 5, 2428 bytes of the mobile service data may be inserted in the region A1, 2580 bytes may be inserted in the region A2, 2772 bytes may be inserted in the region A3, 2472 bytes may be inserted in the region A4, and 2772 bytes may be inserted in the region A5. Herein, trellis initialization data or known data, MPEG header, and RS parity are not included in the mobile service data. As described above, when region A includes a known data sequence at both ends, the receiving system uses channel information that can obtain known data or field synchronization data, so as to perform equalization, thereby providing enforced equalization performance.

Also, region B includes a B1 region located within 8 segments at the beginning of a field synchronization region within the data group (chronologically placed before region A1), and a B2 region located within 8 segments behind the very last known data sequence which is inserted in the data group. For example, 930 bytes of the mobile service data may be inserted in the region B1, and 1350 bytes may be inserted in the region B2. Similarly, trellis initialization data or known data, MPEG header, and RS parity are not included in the mobile service data. In case of region B, the receiving system may perform equalization by using channel information obtained from the field synchronization region. Alternatively, the receiving system may also perform equalization by using channel information that may be obtained from the last known data sequence, thereby enabling the system to respond to the channel changes.

Region C includes a C1 region located within 30 segments including and preceding the $9^{th}$ segment of the field synchronization region (chronologically located before region A), a C2 region located within 12 segments including and following the $9^{th}$ segment of the very last known data sequence within the data group (chronologically located after region A), and a C3 region located in 32 segments after the region C2. For example, 1272 bytes of the mobile service data may be inserted in the region C1, 1560 bytes may be inserted in the region C2, and 1312 bytes may be inserted in the region C3. Similarly, trellis initialization data or known data, MPEG header, and RS parity are not included in the mobile service data. Herein, region C (e.g., region C1) is located chronologically earlier than (or before) region A.

Since region C (e.g., region C1) is located further apart from the field synchronization region which corresponds to the closest known data region, the receiving system may use the channel information obtained from the field synchronization data when performing channel equalization. Alternatively, the receiving system may also use the most recent channel information of a previous data group. Furthermore, in region C (e.g., region C2 and region C3) located before region A, the receiving system may use the channel information obtained from the last known data sequence to perform equalization. However, when the channels are subject to fast and frequent changes, the equalization may not be performed perfectly. Therefore, the equalization performance of region C may be deteriorated as compared to that of region B.

When it is assumed that the data group is allocated with a plurality of hierarchically divided regions, as described above, the block processor 403 may encode the mobile service data, which are to be inserted to each region based upon the turbo code information within the transmission parameter, at a different coding rate.

In addition, apart from the encoded mobile service data outputted from the block processor 403, the group formatter 404 also inserts MPEG header place holders, non-systematic RS parity place holders, main service data place holders, which are related to data deinterleaving in a later process. Herein, the main service data place holders are inserted because a region wherein the mobile service data bytes and the main service data bytes are alternately mixed with one another, based upon the input of the data deinterleaver, exists. For example, based upon the data outputted after the data-deinterleaving process, the place holder for the MPEG header may be allocated at the very beginning of each packet.

Furthermore, the group formatter 404 either inserts known data generated in accordance with a pre-determined method or inserts known data place holders for inserting the known data in a later process. Additionally, place holders for initializing the trellis encoding module 226 of the post-processor 220 are also inserted in the corresponding regions. For example, the initialization data place holders may be inserted in the beginning of the known data sequence. Herein, the size of the mobile service data that can be inserted in a data group may vary in accordance with the sizes of the trellis initialization data or known data (or known data place holders), MPEG header place holders, and RS parity place holders.

The data outputted from the group formatter 404 are inputted to the data deinterleaver 405. And, the data deinterleaver 405 deinterleaves data by performing an inverse process of the data interleaver on the data and place holders within the data group, which are then outputted to the packet formatter 406. The packet formatter 406 removes the main service data place holders and the RS parity place holders that were allocated for the deinterleaving process from the deinterleaved data that are being inputted. Then, the packet formatter 406 groups the remaining portion and replaces the 4-byte MPEG header place holder with an MPEG header.

Also, when the group formatter 404 inserts known data place holders, the packet formatter 406 may insert actual known data in the known data place holders, or may directly output the known data place holders without any modification in order to make replacement insertion in a later process. Thereafter, the packet formatter 406 identifies the data within the packet-formatted data group, as described above, as a 188-byte unit mobile service data packet (i.e., MPEG TS packet), which is then provided to the packet multiplexer 219.

The packet multiplexer 219 multiplexes the mobile service data packet and the main service data packet outputted from the packet formatter 406 in 188-byte units based upon a pre-defined multiplexing method. Then, the packet multiplexer 219 outputs the multiplexed data packets to the data randomizer 221 of the post-processor 220. Herein, the multiplexing method may vary in accordance with various variables of the system design. One of the multiplexing methods of the packet multiplexer 219 consists of providing a burst section along a time axis and, then, transmitting a plurality of data groups during a burst section and transmitting only the main service data during a non-burst section. At this point, main service data may also be transmitted in the burst section. Furthermore, the packet multiplexer 219 can determine the number of data groups included in a single burst, the cycle period of a single burst based upon the transmission parameters (e.g., information of burst size or burst period) provided by the signaling information provider 218.

In this case, mobile service data and main service data co-exist in a burst section, and only the main service data exist in the non-burst section. Therefore, the main service data section transmitting the main service data exist in both the burst section and the non-burst section. At this point, the number of main service data packets included in the main service data section within the burst section and the number of main service data packets included in the main service data section within the non-burst section may be equal to or different from one another. When the mobile service data are transmitted in burst units, as described above, a receiving system that only receives the mobile service data may turn on the power only during the burst section so as to receive the corresponding data. Also, in this case, the receiving system may turn off the power during non-burst sections, thereby preventing the main service data from being received. Thus, the receiving system is capable of reducing excessive power consumption.

However, since a data group including mobile service data in-between the data bytes of the main service data during the packet multiplexing process, the shifting of the chronological position (or place) of the main service data packet becomes relative. Also, a system object decoder (i.e., MPEG decoder) for processing the main service data of the receiving system, receives and decodes only the main service data and recognizes the mobile service data packet as a null data packet (or space-filler null packet). Therefore, when the system object decoder of the receiving system receives a data group including mobile service data and a main service data packet that is multiplexed with the data group, a packet jitter occurs.

At this point, since a multiple-level buffer for the video data exists in the system object decoder and the size of the buffer is relatively large, the packet jitter generated from the packet multiplexer 219 does not cause any serious problem in case of the video data. However, since the size of the buffer for the audio data is relatively small, the packet jitter may cause some problem. More specifically, due to the packet jitter, an overflow or underflow may occur in the buffer for the main service data of the digital broadcast receiving system (e.g., the buffer for the audio data). Therefore, the packet jitter mitigator 214 re-adjusts the relative position of the main service data packet so that the overflow or underflow does not occur in the system object decoder.

In the present invention, examples of repositioning places for the audio data packets within the main service data in order to minimize the influence on the operations of the audio buffer will be described in detail. The packet jitter mitigator 214 repositions audio packets of the main service data section so that the audio data packets of the main service can be positioned as equally and uniformly as possible. The standard for repositioning the audio data packets in the main service data performed by the packet jitter mitigator 214 will now be described. Herein, it is assumed that the packet jitter mitigator 214 knows the same multiplexing information as that of the packet multiplexer 219, which is placed further behind the packet jitter mitigator 214.

Firstly, if one audio data packet exists in the main service data section (e.g., the main service data section positioned between two data groups) within the burst section, the audio data packet is positioned at the very beginning of the main service data section. Alternatively, if two audio data packets exist in the corresponding data section, one audio data packet is positioned at the very beginning and the other audio data packet is positioned at the very end of the main service data section. Further, if more than three audio data packets exist, one audio data packet is positioned at the very beginning of the main service data section, another is positioned at the very end of the main service data section, and the remaining audio data packets are positioned between the first and last audio data packets at equal intervals.

Secondly, during the main service data section before the beginning of a burst section, the audio data packet is placed at the very end of the main service data section. Thirdly, during a main service data section after the end of burst section, the audio data packet is positioned at the very beginning of the main service data section. And, finally, the data packets other than audio data packets are positioned to vacant spaces (i.e., spaces that are not designated for the audio data packets) in accordance with the inputted order.

Meanwhile, when the positions of the main service data packets are relatively re-adjusted, associated program clock reference (PCR) values may also be modified accordingly. The PCR value corresponds to a time reference value for synchronizing the time of the MPEG decoder. Herein, the PCR value is inserted in a specific region of a TS packet and then transmitted. In the embodiment of the present invention, the packet jitter mitigator 214 may also perform the function of correcting (or modifying) the PCR value.

The data outputted from the packet jitter mitigator 214 are inputted to the packet multiplexer 219. As described above, the packet multiplexer 219 multiplexes the main service data packet outputted from the packet jitter mitigator 214 with the mobile service data packet outputted from the pre-processor 216 into a burst structure in accordance with a pre-determined multiplexing rule. Then, the packet multiplexer 219 outputs the multiplexed data packets to the data randomizer 221 of the post-processor 220.

If the inputted data correspond to the main service data packet, the data randomizer 221 performs the same randomizing process as that of the conventional randomizer. More specifically, the synchronization byte within the main service data packet is deleted. Then, the remaining 187 data bytes are randomized by using a pseudo random byte generated from the data randomizer 221. Thereafter, the randomized data are outputted to the RS encoder/non-systematic RS encoder 222. On the other hand, if the inputted data correspond to the mobile service data packet, the data randomizer 221 deletes the synchronization byte from the 4-byte MPEG header included in the mobile service data packet and, then, performs the randomizing process only on the remaining 3 data bytes of the MPEG header. Thereafter, the randomized data bytes are outputted to the RS encoder/non-systematic RS encoder 222.

Additionally, the randomizing process is not performed on the remaining portion of the mobile service data excluding the MPEG header. In other words, the remaining portion of the mobile service data packet is directly outputted to the RS encoder/non-systematic RS encoder 222 without being randomized. This is because a randomizing process has already been performed on the mobile service data in the data randomizer 401. Also, the data randomizer 221 may or may not perform a randomizing process on the known data (or known data place holders) and the initialization data place holders included in the mobile service data packet.

The RS encoder/non-systematic RS encoder 222 performs an RS encoding process on the data being randomized by the data randomizer 221 or on the data bypassing the data randomizer 221, so as to add 20 bytes of RS parity data. Thereafter, the processed data are outputted to the data interleaver 223. Herein, if the inputted data correspond to the main service data packet, the RS encoder/non-systematic RS encoder 222 performs the same systematic RS encoding process as that of the conventional system, thereby adding the 20-byte RS parity data at the end of the 187-byte data. Alternatively, if the inputted data correspond to the mobile service data packet, the RS encoder/non-systematic RS encoder 222 performs a non-systematic RS encoding process. At this point, the 20-byte RS parity data obtained from the non-systematic RS encoding process are inserted in a pre-decided parity byte place within the mobile service data packet.

The data interleaver 223 corresponds to a byte unit convolutional interleaver. The output of the data interleaver 223 is inputted to the parity replacer 224 and to the non-systematic RS encoder 225. Meanwhile, a process of initializing a memory within the trellis encoding module 226 is primarily required in order to decide the output data of the trellis encoding module 226, which is located after the parity replacer 224, as the known data pre-defined according to an agreement between the receiving system and the transmitting system. More specifically, the memory of the trellis encoding module 226 should first be initialized before the received known data sequence is trellis-encoded. At this point, the beginning portion of the known data sequence that is received corresponds to the initialization data place holder and not to the actual known data. Herein, the initialization data place holder has been included in the data by the group formatter 404 in an earlier process. Therefore, the process of generating initialization data and replacing the initialization data place holder of the corresponding memory with the generated initialization data are required to be performed immediately before the inputted known data sequence is trellis-encoded.

Additionally, a value of the trellis memory initialization data is decided and generated based upon a memory status of the trellis encoding module 226. Further, due to the newly replaced initialization data, a process of newly calculating the RS parity and replacing the RS parity, which is outputted from the data interleaver 223, with the newly calculated RS parity is required. Therefore, the non-systematic RS encoder 225 receives the mobile service data packet including the initialization data place holders, which are to be replaced with the actual initialization data, from the data interleaver 223 and also receives the initialization data from the trellis encoding module 226.

Among the inputted mobile service data packet, the initialization data place holders are replaced with the initialization data, and the RS parity data that are added to the mobile service data packet. Thereafter, a new non-systematic RS parity is calculated and then outputted to the parity replacer 224. Accordingly, the parity replacer 224 selects the output of the data interleaver 223 as the data within the mobile service data packet, and the parity replacer 224 selects the output of the non-systematic RS encoder 225 as the RS parity data. Then, the selected data are outputted to the trellis encoding module 226.

Meanwhile, if the main service data packet is inputted or if the mobile service data packet, which does not include any initialization data place holders that are to be replaced, is inputted, the parity replacer 224 selects the data and RS parity that are outputted from the data interleaver 223. Then, the parity replacer 224 directly outputs the selected data to the trellis encoding module 226 without any modification. The trellis encoding module 226 converts the byte-unit data to symbol units and performs a 12-way interleaving process so as to trellis-encode the received data. Thereafter, the processed data are outputted to the synchronization multiplexer 230. The synchronization multiplexer 230 inserts a field synchronization signal and a segment synchronization signal to the data outputted from the trellis encoding module 226 and, then, outputs the processed data to the pilot inserter 241 of the transmission unit 240. Herein, the data having a pilot inserted by the pilot inserter 241 are modulated by the modulator 242 in accordance with a pre-decided modulating method (e.g., VSB method). Thereafter, the modulated data are transmitted to each receiving system through the radio frequency (RF) up-converter 243.

Meanwhile, the mobile service multiplexer 150 and the transmitter 200 should be connected with one another so as to closely communicate with one another. Although the mobile service multiplexer 150 decides the transmission parameter that is to be used when the transmitter 200 transmits data, the transmission parameter decides the data rate of the data transmitted from the transmitter 200. When the service multiplexer 100 multiplexes the mobile service data and PSI/PSIP tables for main service with the main service data and PSI/PSIP tables for mobile service in TS packet units, the average data rate of each service is maintained at the same rate preset by the service multiplexer 100.

However, when the demultiplexer 211 of the transmitter 200 discards (or removes) the space-filler null data packet, thereby identifying the data packet as the main service data packet and the mobile service data packet, the data rate of the mobile service data packet is constantly changed. Therefore, in order to allow the data transmission to be processed from the transmitter 200 at a constant data rate, the demultiplexed main service data packet is temporarily stored in the main data buffer 213 and then provided to the packet jitter mitigator 214. Alternatively, the demultiplexed mobile service data packet is temporarily stored in the mobile data buffer 215 and then provided to the pre-processor 216.

At this point, a large number of mobile service data packets exceeding the size of the mobile data buffer 215 may temporarily seek to be accumulated in the mobile data buffer 215. Such phenomenon occurs when the data rate of the mobile service data packet being inputted to the mobile data buffer 215 is greater (or faster) than the data rate of the mobile service data packet being outputted from the mobile data buffer 215. This phenomenon is referred to as an overflow. Conversely, the number of mobile service data packets accumulated in the mobile data buffer 215 may be temporarily small (or insufficient). Therefore, all mobile service data packets within the mobile data buffer 215 may be outputted before a new mobile service data packet is inputted to the mobile data buffer 215. Such phenomenon occurs when the data rate of the mobile service data packet being inputted to the mobile data buffer 215 is smaller (or slower) than the data rate of the mobile service data packet being outputted from the mobile data buffer 215. This phenomenon is referred to as an underflow.

However, when either an overflow or an underflow occurs in the mobile data buffer 215, a problem may occur in the service transmission processed through the transmitter 200. For example, when an overflow occurs, a new set of data may overwrite the already-existing data within the mobile data buffer 215, even before the data existing in the mobile data buffer 215 can be transmitted, thereby causing the previous (or already-existing) data to be lost. On the other hand, when an underflow occurs, the transmitter 200 may irregularly transmit large amounts of null data to the receiving system, thereby causing problems in data reception control and data decoding in the receiving system.

In another example, the data rate of the mobile service data being inputted to the mobile service multiplexer 150 and the transmission data rate of the transmitter 200 may not accurately match. Such phenomenon may occur when the mobile service multiplexer 150 multiplexes the mobile service data without being able to accurately provide (or support) the data rate for each transmission mode of the transmitter 200. At this point, the mobile service multiplexer 150 controls the PSI/PSIP generator 130 to generate transmission parameters so that the mobile service data can be transmitted at a data rate most approximate to the output data rate corresponding to each transmission mode of the transmitter 200. Thereafter, the mobile service multiplexer 150 transmits the generated transmission parameters to the transmitter 200. However, the above-described problem, which may occur in the service transmission processed through the transmitter 200, may also occur in the example given herein.

In order to resolve such problems, the transmitter 200 may temporarily control the transmission parameters so as to compensate the data rate. According to the present invention, a method for compensating the data rate by controlling the transmission parameters may include a method of controlling the burst period, a method of controlling the burst size, and so on. According to another embodiment of the present invention, the transmitter 200 may temporarily add or remove additional null data packets, thereby compensating the data rate. At this point, the data rate is adjusted in connection with the amount of data accumulated in the mobile data buffer 215.

Figure 7:
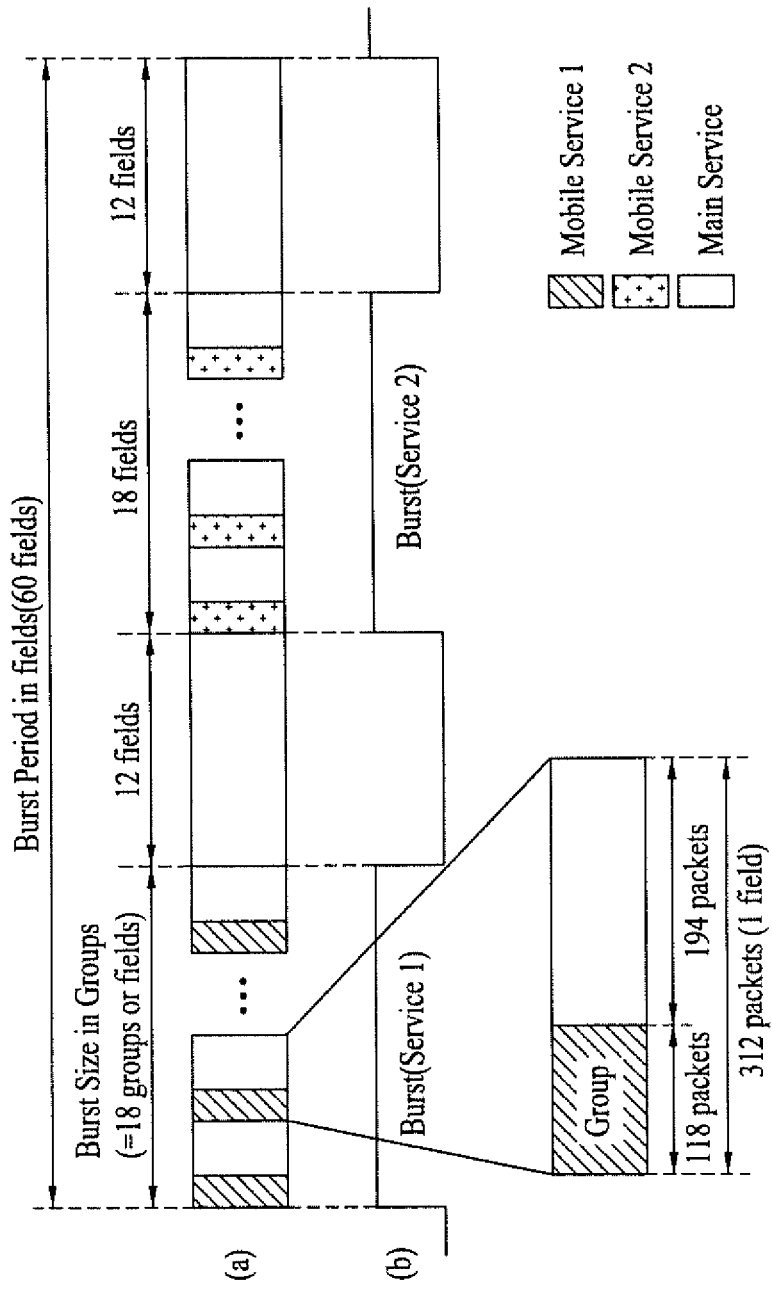
FIG. 7 illustrates burst and data group structures according to an embodiment of the present invention.

FIG. 7 illustrates exemplary operations of the packet multiplexer 219 according to a detailed embodiment of the present invention. Herein, FIG. 7 illustrates an example of performing data transmission in burst units based upon the transmission parameters. More specifically, FIG. 7 illustrates an example of two different mobile service data types (e.g., two mobile service programs) being multiplexed in burst units with main service data. Referring to FIG. 7, 118 mobile service data packets gathered (or grouped) to configure a data group, and 18 data groups are grouped to form a burst. In other words, 18 data groups are transmitted as a single burst.

According to an embodiment of the present invention, two burst sections for the two types of mobile service each includes 18 data groups, each burst being repeated at a cycle period of 60 fields. Herein, one burst section is configured of 30 fields, wherein a burst-on section includes 18 fields, and a burst-off section includes 12 fields. More specifically, one field within the burst-on section includes one data group. For example, when a data group is configured of 118 data packets, as shown in FIG. 7, a main service data packet may be transmitted to the remaining 194 data packet sections within the corresponding field. Each field consists of 312 data segments, wherein the data within the data group are allocated to 118 segments, and wherein the main service data are allocated to 194 segments.

Alternatively, if the packet multiplexer 219 of FIG. 7 transmits a single mobile service type, each burst section includes 18 data groups, and the repetition cycle period of each burst corresponds to 30 fields. At this point, the burst size of each mobile service or the transmission parameters applied in the pre-processor 216 may be applied differently for each service type. And, as described above, the mobile service multiplexer 150 may notify (or transmit) the transmission parameters to the transmitter 200 in a PSI/PSIP format.

When the transmitting system transmits the mobile service data in a burst structure, as described above, the receiving system turns on the power only during the corresponding burst section including the desired service, thereby receiving the corresponding service data. On the other hand, the receiving system turns off the power during the remaining burst sections, thereby enabling the receiving system to reduce excessive power consumption. Furthermore, even when the receiving system turns on the power during the burst-on section, wherein a burst section includes a data group, thereby receiving data, and even when the same receiving system turns off the power during the burst-off section, so as to reduce power consumption, the data receiving performance is not affected.

Figure 8:
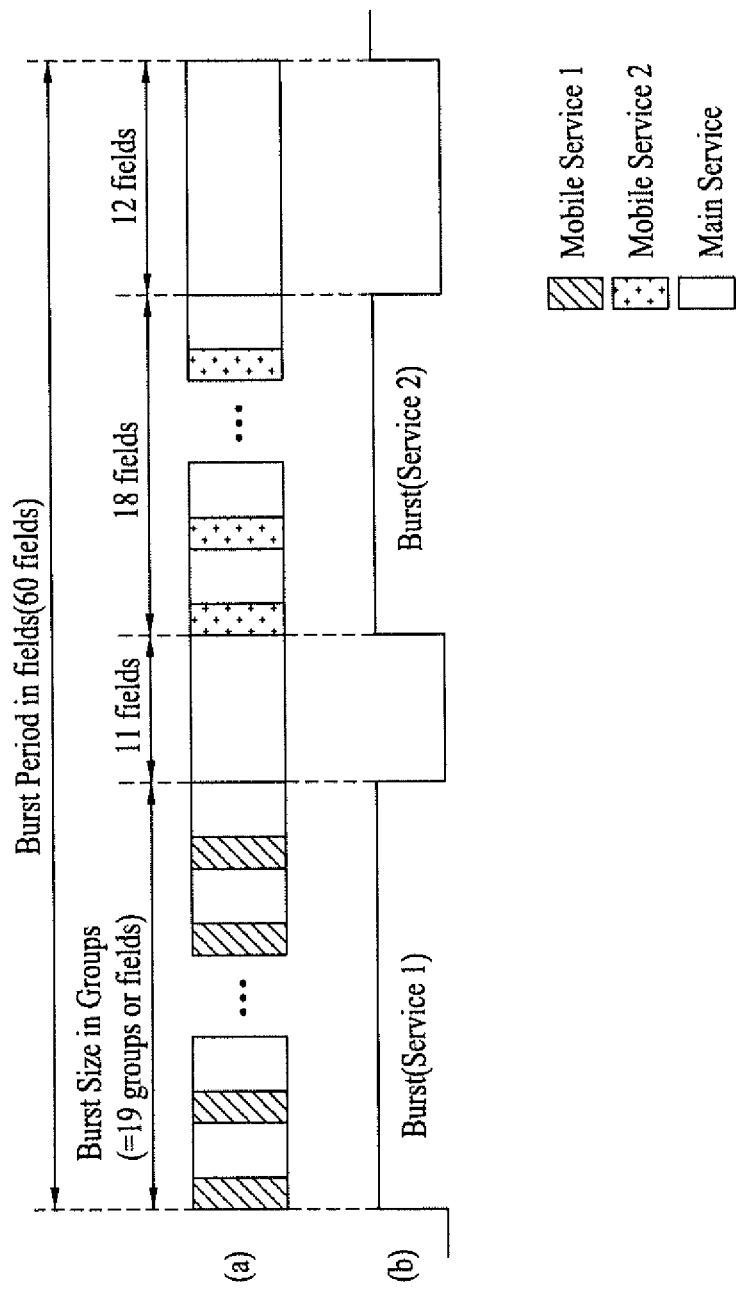
FIG. 8 illustrates a data structure showing an example of adjusting data rate according to an embodiment of the present invention.

FIG. 8 illustrates a data structure showing an example of a method for compensating data rate performed by the transmitter according to a first embodiment of the present invention. Herein, FIG. 8 illustrates an example wherein the data rate is compensated by adjusting the burst size. More specifically, FIG. 8 illustrates an example of enlarging the burst size so that a larger number of mobile service data packets can be outputted from the mobile data buffer 215 as compared to the average output rate. This example may be applied when the data rate of the mobile service data packet being inputted to the mobile data buffer 215 is greater (or faster) than the data rate of the mobile service data packet being outputted from the mobile data buffer 215.

According to the first embodiment of the present invention, first and second threshold values are predetermined. And, when the amount of data accumulated in the mobile data buffer 215 is larger than the first threshold value, it is determined that an overflow has occurred. On the other hand, when the amount of data accumulated in the mobile data buffer 215 is smaller than the second threshold value, it is determined that an underfloor has occurred. However, if the amount of data accumulated in the mobile data buffer 215 is between the first and second threshold values, then the data rate is not required to be compensated. Accordingly, in this case, the burst size is not adjusted. Furthermore, when an overflow occurs, the burst size is enlarged so that a larger number of mobile service data packets can be outputted from the mobile data buffer 215 than the average output rate. Conversely, when an underflow occurs, the burst size is reduced so that a smaller number of mobile service data packets can be outputted from the mobile data buffer 215 than the average output rate.

At this point, according to the embodiment of the present invention, the buffer controller 217 sets the first and second threshold values and adjusts the burst size. More specifically, the buffer controller 217 monitors the mobile data buffer 215. Then, when an overflow or underflow occurs, the buffer controller 217 adjusts the burst size among the transmission parameters of the signaling information provider 218. Subsequently, the signaling information provider 218 transmits the transmission parameters including the adjusted burst size information to the corresponding block.

Figure 9:
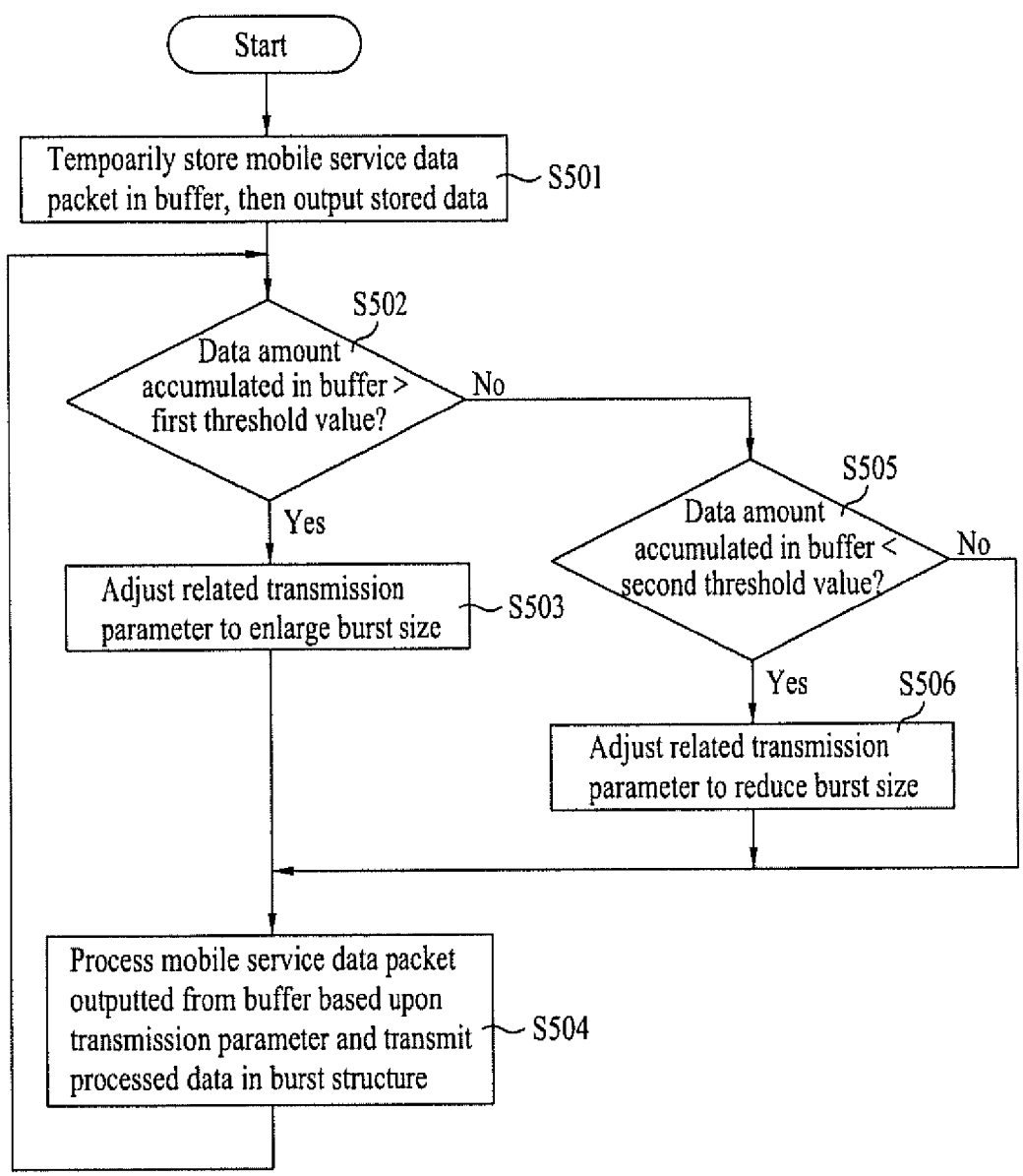
FIG. 9 illustrates a flow chart showing an example of adjusting data rate according to an embodiment of the present invention.

FIG. 9 illustrates a flow chart showing an example of a method for compensating data rate performed by the transmitter according to the first embodiment of the present invention. Herein, FIG. 9 illustrates an example wherein the data rate is compensated by adjusting the burst size. More specifically, the mobile service data packet demultiplexed by the demultiplexer 211 is temporarily stored in the mobile data buffer 215 and then outputted (S501). At this point, the buffer controller 217 determines whether the amount of data accumulated in the mobile data buffer 215 is larger than the first threshold value (S502).

When, the buffer controller 217 determines that the amount of data accumulated in the mobile data buffer 215 is larger than the first threshold value, the buffer controller 217 enlarges the burst size so that a larger number of mobile service data packets can be outputted from the mobile data buffer 215 than the average output rate (S503). More specifically, while monitoring the amount of data being accumulated in the mobile data buffer 215, when the number of data packets being accumulated in the mobile data buffer 215 is larger than the predetermined first threshold value, the buffer controller 217 temporarily controls the corresponding transmission parameter so that the burst size can be enlarged. For example, when the current burst size is set to be equal to 18 data groups, and when an overflow occurs, the corresponding transmission parameter of the signaling information provider 218 is controlled so that the next burst size can be enlarged to 19 data groups, as shown in FIG. 8. In this case, the burst period is not altered. Therefore, the burst-on section within the corresponding burst section includes 19 fields, and the burst-off section includes 11 fields. Thereafter, the adjusted transmission parameter is provided to the pre-processor 216 and packet multiplexer 219 of the transmitter 200 and simultaneously transmitted to the receiving system.

Meanwhile, the buffer controller 217 also determines whether the amount of data accumulated in the mobile data buffer 215 is smaller than the second threshold value (5505). When, the buffer controller 217 determines that the amount of data accumulated in the mobile data buffer 215 is smaller than the second threshold value, the buffer controller 217 reduces the burst size so that a smaller number of mobile service data packets can be outputted from the mobile data buffer 215 than the average output rate (5506). Accordingly, the number of mobile service data packets accumulated in the mobile data buffer 215 may be increased.

More specifically, while monitoring the amount of data being accumulated in the mobile data buffer 215, when the number of data packets being accumulated in the mobile data buffer 215 is smaller than the predetermined second threshold value, the buffer controller 217 temporarily controls the corresponding transmission parameter so that the burst size can be reduced. For example, when the current burst size is set to be equal to 18 data groups, and when an underfloor occurs, the corresponding transmission parameter of the signaling information provider 218 is controlled so that the next burst size can be reduced to 17 data groups. In this case, the burst period is not altered. Therefore, the burst-on section within the corresponding burst section includes 17 fields, and the burst-off section includes 13 fields.

Thereafter, the adjusted transmission parameter is provided to the pre-processor 216 and packet multiplexer 219 of the transmitter 200 and simultaneously transmitted to the receiving system. The pre-processor 216 then performs pre-processes on the mobile service data packets based upon the corresponding transmission parameter, and the packet multiplexer 219 refers to the adjusted burst size so as to multiplex the output of the packet jitter mitigator 214 and the output of the pre-processor 216, thereby transmitting the multiplexed data in a burst structure (S504).

Figure 10:
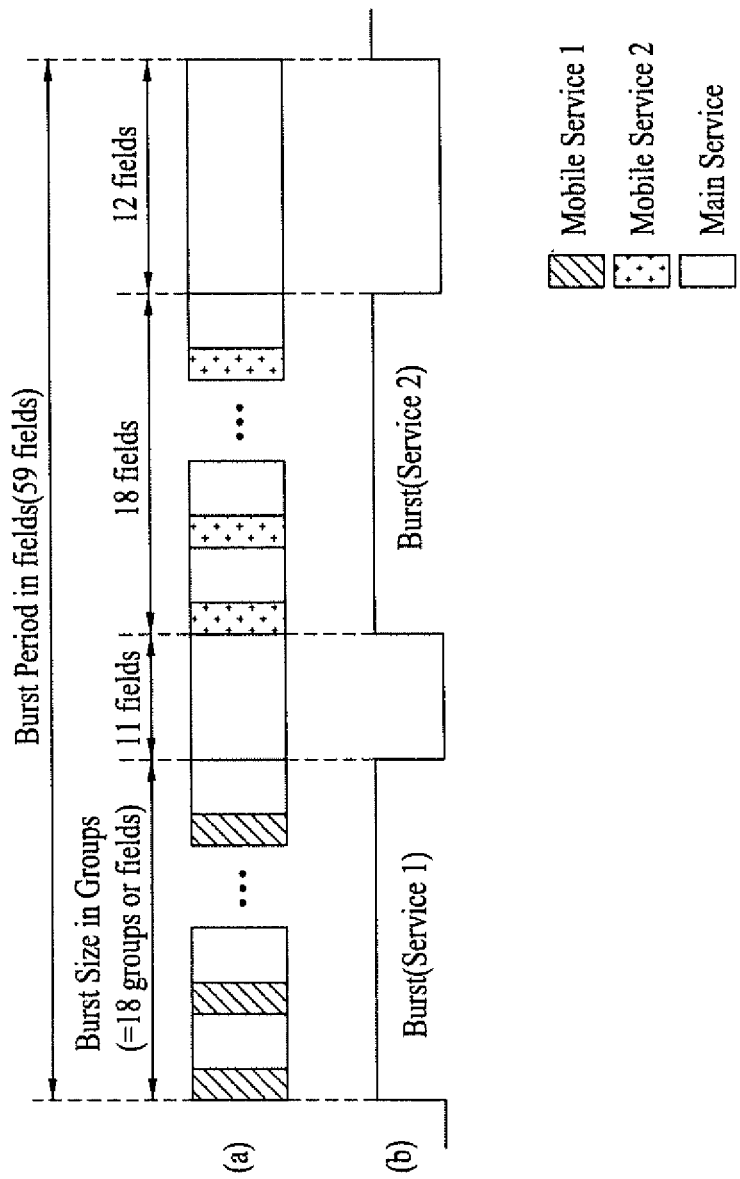
FIG. 10 illustrates a data structure showing an example of adjusting data rate according to another embodiment of the present invention.

FIG. 10 illustrates a data structure showing an example of a method for compensating data rate performed by the transmitter according to a second embodiment of the present invention. Herein, FIG. 10 illustrates an example wherein the data rate is compensated by adjusting the burst period. More specifically, FIG. 10 illustrates an example of reducing the burst period so that a larger number of mobile service data packets can be outputted from the mobile data buffer 215 as compared to the average output rate. This example may be applied when the data rate of the mobile service data packet being inputted to the mobile data buffer 215 is greater (or faster) than the data rate of the mobile service data packet being outputted from the mobile data buffer 215.

According to the second embodiment of the present invention, first and second threshold values are also predetermined. And, when the amount of data accumulated in the mobile data buffer 215 is larger than the first threshold value, it is determined that an overflow has occurred. On the other hand, when the amount of data accumulated in the mobile data buffer 215 is smaller than the second threshold value, it is determined that an underflow has occurred. However, if the amount of data accumulated in the mobile data buffer 215 is between the first and second threshold values, then the data rate is not required to be compensated. Accordingly, in this case, the burst period is not adjusted. Furthermore, when an overflow occurs, the burst period is reduced (or shortened) so that a larger number of mobile service data packets can be outputted from the mobile data buffer 215 than the average output rate. Conversely, when an underflow occurs, the burst period is extended so that a smaller number of mobile service data packets can be outputted from the mobile data buffer 215 than the average output rate.

At this point, according to the second embodiment of the present invention, the buffer controller 217 sets the first and second threshold values and adjusts the burst period. More specifically, the buffer controller 217 monitors the mobile data buffer 215. Then, when an overflow or underflow occurs, the buffer controller 217 adjusts the burst period among the transmission parameters of the signaling information provider 218. Subsequently, the signaling information provider 218 transmits the transmission parameters including the adjusted burst period information to the corresponding block.

Figure 11:
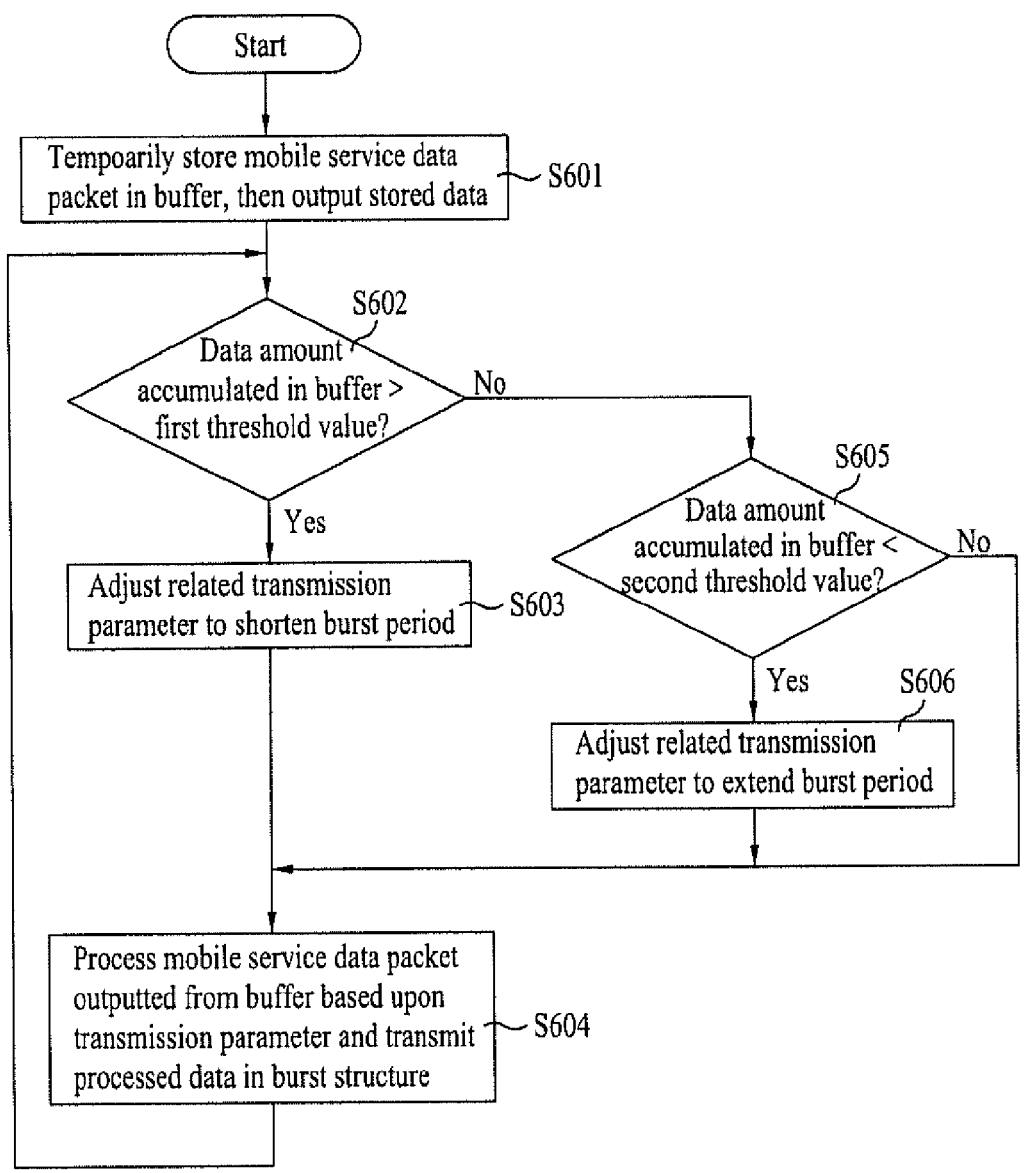
FIG. 11 illustrates a flow chart showing an example of adjusting data rate according to another embodiment of the present invention.

FIG. 11 illustrates a flow chart showing an example of a method for compensating data rate performed by the transmitter according to the second embodiment of the present invention. Herein, FIG. 11 illustrates an example wherein the data rate is compensated by adjusting the burst period. More specifically, the mobile service data packet demultiplexed by the demultiplexer 211 is temporarily stored in the mobile data buffer 215 and then outputted (S601). At this point, the buffer controller 217 determines whether the amount of data accumulated in the mobile data buffer 215 is larger than the first threshold value (S602).

When, the buffer controller 217 determines that the amount of data accumulated in the mobile data buffer 215 is larger than the first threshold value, the buffer controller 217 reduces the burst period so that a larger number of mobile service data packets can be outputted from the mobile data buffer 215 than the average output rate (S603). More specifically, while monitoring the amount of data being accumulated in the mobile data buffer 215, when the number of data packets being accumulated in the mobile data buffer 215 is larger than the predetermined first threshold value, the buffer controller 217 temporarily controls the corresponding transmission parameter so that the burst period can be reduced. For example, when the current burst period is set to be equal to 60 fields, and when an overflow occurs, the corresponding transmission parameter of the signaling information provider 218 is controlled so that the next burst period can be reduced to 59 fields, as shown in FIG. 10. In this case, the burst cycle is not altered. Therefore, the burst-on section within the corresponding burst section includes 18 fields, whereas the burst-off section includes 11 fields. Thereafter, the adjusted transmission parameter is provided to the pre-processor 216 and packet multiplexer 219 of the transmitter 200 and simultaneously transmitted to the receiving system.

Meanwhile, the buffer controller 217 also determines whether the amount of data accumulated in the mobile data buffer 215 is smaller than the second threshold value (S605). When, the buffer controller 217 determines that the amount of data accumulated in the mobile data buffer 215 is smaller than the second threshold value, the buffer controller 217 extends the burst period so that a smaller number of mobile service data packets can be outputted from the mobile data buffer 215 than the average output rate (S606).

More specifically, while monitoring the amount of data being accumulated in the mobile data buffer 215, when the number of data packets being accumulated in the mobile data buffer 215 is smaller than the predetermined second threshold value, the buffer controller 217 temporarily controls the corresponding transmission parameter so that the burst period can be extended. For example, when the current burst period is set to be equal to 60 fields, and when an underflow occurs, the corresponding transmission parameter of the signaling information provider 218 is controlled so that the next burst period can be extended to 61 fields. In this case, the burst cycle is not altered. Therefore, the burst-on section within the corresponding burst section includes 18 fields, whereas the burst-off section includes 13 fields.

Thereafter, the adjusted transmission parameter is provided to the pre-processor 216 and packet multiplexer 219 of the transmitter 200 and simultaneously transmitted to the receiving system. The pre-processor 216 then performs pre-processes on the mobile service data packets based upon the corresponding transmission parameter, and the packet multiplexer 219 refers to the adjusted burst period so as to multiplex the output of the packet jitter mitigator 214 and the output of the pre-processor 216, thereby transmitting the multiplexed data in a burst structure (S604).

Figure 12:
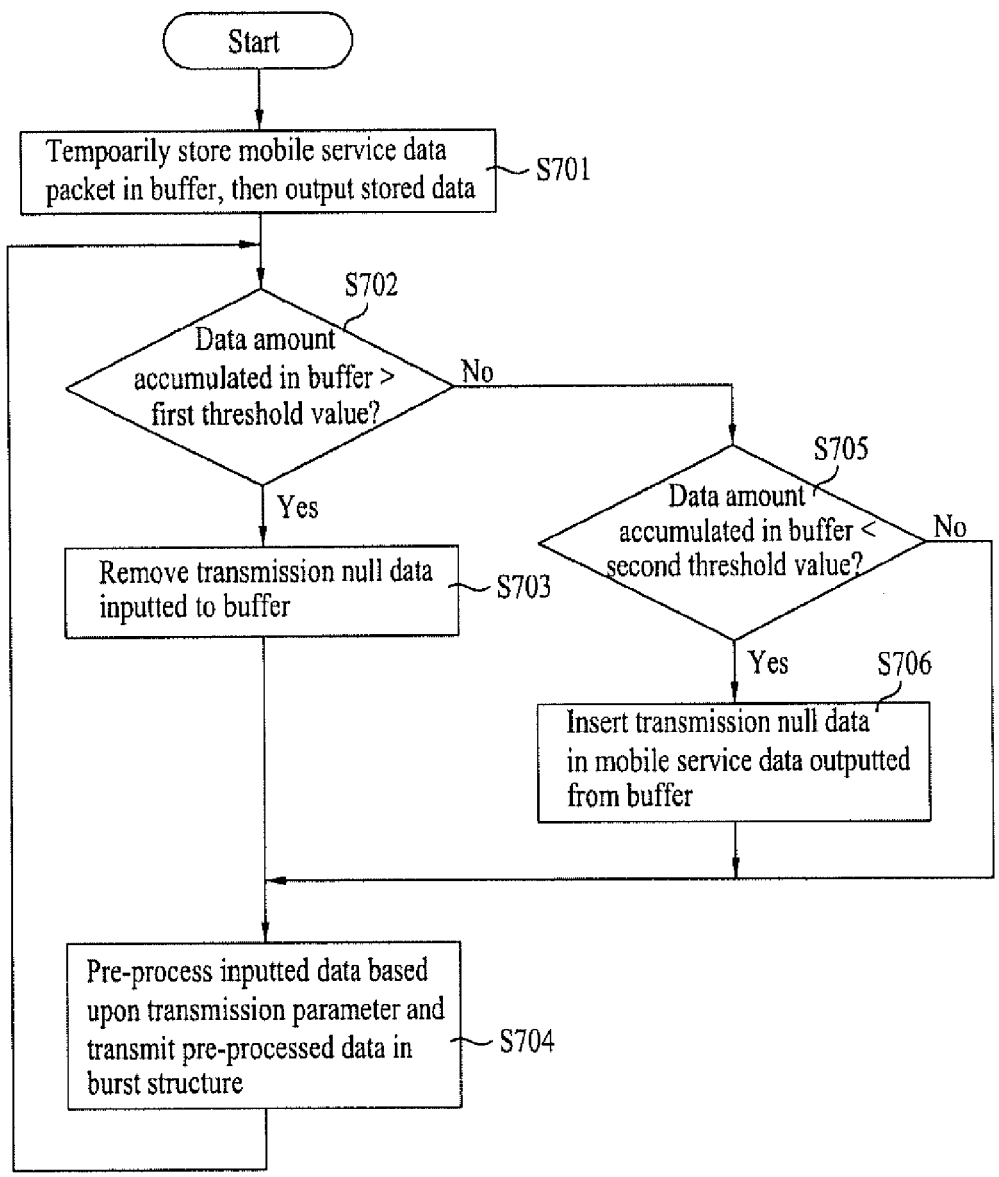
FIG. 12 illustrates a flow chart showing an example of adjusting data rate according to yet another embodiment of the present invention.

FIG. 12 illustrates a flow chart showing an example of a method for compensating data rate performed by the transmitter according to a third embodiment of the present invention. Herein, FIG. 12 illustrates an example wherein the data rate is compensated by inserting or adding null data. According to the third embodiment of the present invention, in order to differentiate the inserted or added null data from the null data packet for filler (or space-filler null data packet), which is inserted from the service multiplexer 100 in order to match the data rate, the null data inserted or added to compensate the data rate will be referred to as a null data packet for transmission (or transmission null data packet). Although the space-filler null data packet is removed (or deleted) by the transmitter 200 without being processed, the transmission null data packet inserted from the transmitter 200 is recognizes as a mobile service data packet and processed accordingly, thereby transmitted to the receiving system.

Additionally, when the mobile service data being inputted to the mobile service multiplexer 150 of the service multiplexer 100 is configured in a packet format, a null data packet may be required to be inserted in order to match the amount of data during the compression encoding process. At this point, the inserted null data packet may be treated and processed identically as the mobile service data packets by the service multiplexer 100 and the transmitter 200. Thereafter, the processed null data packet is transmitted to the receiving system. Therefore, in the present invention, the null data packet inserted during the compression encoding process will also be referred to as the transmission null data packet. The A/V decoder of the receiving system removes the transmission null data packet from the inputted data and performs decoding only on the mobile service data packet. At this point, in this embodiment of the present invention the insertion of the transmission null data packet is performed at the input end of the pre-processor 216, and the removal of the transmission null data packet is performed at the input end of the mobile data buffer 215.

The method of inserting the transmission null data packet to the pre-processor 216 is a method that may be applied when the transmission data rate of the transmitter 200 is larger than the output data rate of the service multiplexer 100, which corresponds to an underflow. In this case, the pre-processor 216 not only receives the mobile service data packet outputted from the mobile data buffer 215 but also additionally receives the transmission null data packet. Conversely, the method of removing the transmission null data packet inputted to the pre-processor 216 is a method that may be applied when the output data rate of the service multiplexer 100 is larger than the transmission data rate of the transmitter 200, which corresponds to an overflow. In this case, the transmission null data packets included in the mobile service data packets being inputted to the mobile data buffer 215 are removed, thereby matching the input and output data rates of the mobile data buffer 215.

According to the third embodiment of the present invention, first and second threshold values are also predetermined. And, when the amount of data accumulated in the mobile data buffer 215 is larger than the first threshold value, it is determined that an overflow has occurred. On the other hand, when the amount of data accumulated in the mobile data buffer 215 is smaller than the second threshold value, it is determined that an underflow has occurred. In this embodiment, the buffer controller 217 determines (or sets) the first and second threshold values. Accordingly, when an underflow occurs, a transmission null data packet is generated and outputted to the pre-processor 216. On the other hand, when an underflow occurs, a transmission null data packet inputted to the mobile data buffer 215 is removed.

More specifically, the mobile service data packet demultiplexed by the demultiplexer 211 is temporarily stored in the mobile data buffer 215 and then outputted (S701). At this point, the buffer controller 217 determines whether the amount of data accumulated in the mobile data buffer 215 is larger than the first threshold value (S702). When, the buffer controller 217 determines that the amount of data accumulated in the mobile data buffer 215 is larger than the first threshold value, and after the transmission null data packet is removed from the data packets inputted to the mobile data buffer 215, the remaining data packets are inputted to the mobile data buffer 215 (S703). More specifically, when the input data rate of the mobile data buffer 215 is larger than the output data rate of the mobile data buffer 215, thereby causing the number of data packets being accumulated in the mobile data buffer 215 to become larger than the predetermined first threshold value, an overflow occurs. Therefore, the null data packets for transmission (or transmission null data packets) are partially removed from the mobile service data packets inputted to the mobile data buffer 215, thereby adjusting the input and output data rates of the mobile data buffer 215.

Furthermore, the buffer controller 217 determines whether the amount of data accumulated in the mobile data buffer 215 is smaller than the second threshold value (S705). When, the buffer controller 217 determines that the amount of data accumulated in the mobile data buffer 215 is smaller than the second threshold value, the data packets outputted from the data packets are outputted to the pre-processor 216 and, simultaneously, a transmission null data packet is generated and outputted to the pre-processor 216 (S706). Accordingly, the data rate outputted from the mobile data buffer 215 becomes lower in accordance with the data rate being inputted to the mobile data buffer 215. Additionally, the pre-processor 216 recognizes the transmission null data packet inserted in Step 706 as a mobile service data packet and processes the transmission null data packet accordingly. Thereafter, the processed transmission null data packet is transmitted to the receiving system.

The A/V decoder of the receiving system removes the transmission null data packet from the inputted data and performs decoding only on the mobile service data packet. The pre-processor 216 then performs pre-processes on the mobile service data packets based upon the corresponding transmission parameter, which is provided from the signaling information provider 218, as described above. Then, the packet multiplexer 219 refers to the burst size information and burst period information within the transmission parameter, so as to multiplex the output of the packet jitter mitigator 214 and the output of the pre-processor 216. Thereafter, the multiplexed data are transmitted in a burst structure (S704).

According to the embodiment of the present invention, a portion of the mobile service data packet or data group may be allocated for the signaling information including the transmission parameters, wherein the transmission parameters may be inserted. In this case, the signaling information is treated and processed identically as the mobile service data. Alternatively, the signaling information may be multiplexed with another data type and then inserted. For example, when multiplexing the known data and the mobile service data, the signaling information may be inserted in a place (or position) where known data may be inserted instead of the actual known data. Otherwise, the signaling information may be combined with the known data and then inserted. Also, a portion of the reserved region within the field synchronization segment of the transmission frame may be allocated for the signaling information, wherein the signaling information may be inserted.

Meanwhile, when the signaling information is inserted in the field synchronization segment region or the known data region and then transmitted, and when the signaling information passes through the transmission channel, the reliability of the signaling information may be reduced. Therefore, one of pre-defined patterns may be inserted based upon the signaling information. At this point, the receiving system performs a correlation operation between the received signal and the pre-defined patterns so as to recognize the signaling information.

As described above, the description of the present invention presents a method of temporarily adjusting the data rate by having the transmitter 200 temporarily adjust the burst size or the burst period or by having the transmitter 200 remove or insert null data, when the output data rate of the service multiplexer 100 does not coincide with (or match) the transmission data rate of the transmitter 200. According to another embodiment of the present invention, at least one of the methods of temporarily adjusting the burst size, temporarily adjusting the burst period, and removing or inserting null data may be used independently or in combination in order to adjust the data rate. For example, when an overflow occurs, the burst period is adjusted. Alternatively, when an underflow occurs, the null data may be inserted.

Figure 13:
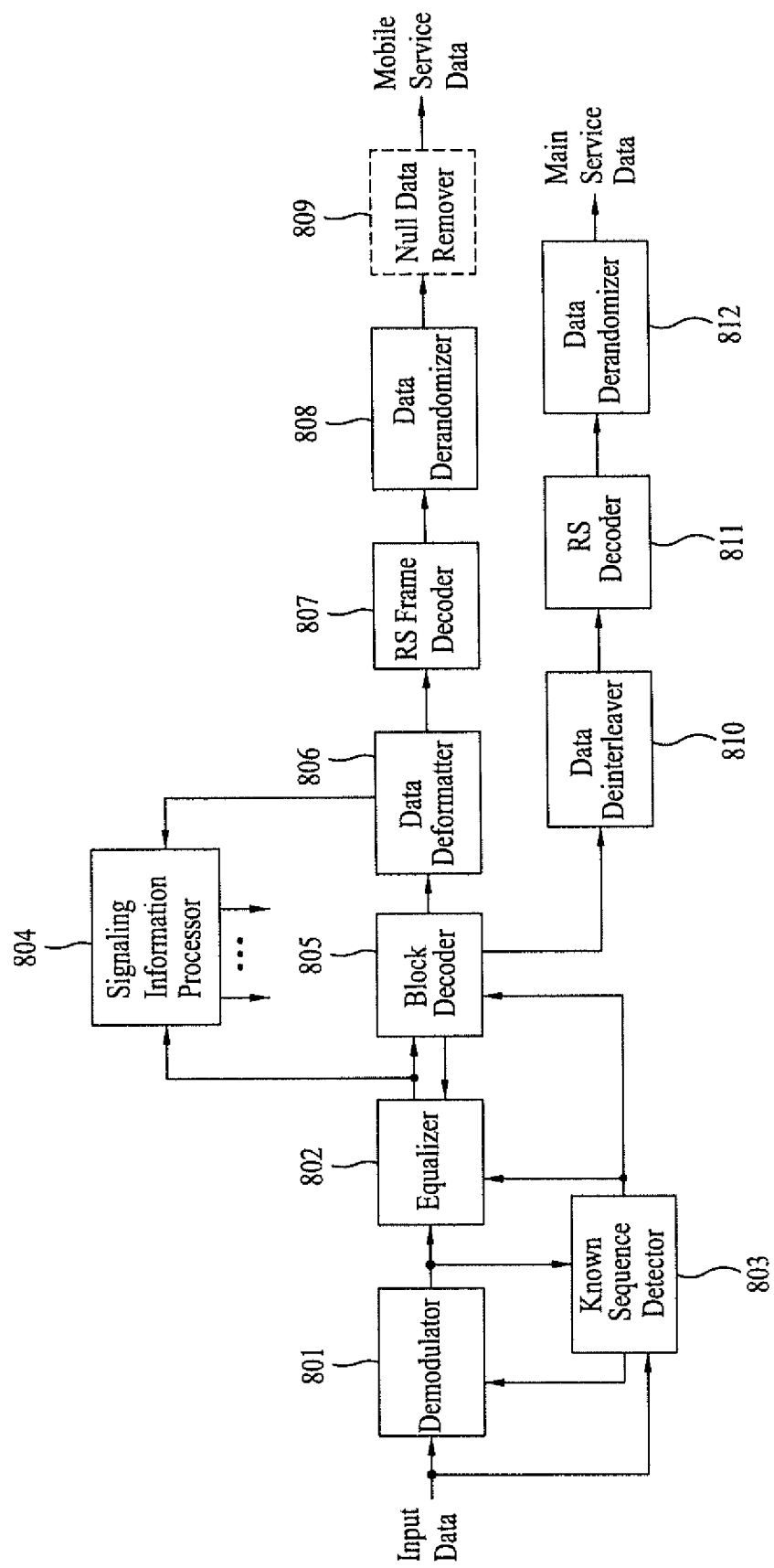
FIG. 13 illustrates a block diagram showing a structure of a receiving system according to an embodiment of the present invention.

FIG. 13 illustrates a block diagram showing a structure of a receiving system according to the present invention. Herein, data inputted to the receiving system of FIG. 13 may include the transmission null data, which have been inserted by the transmitting system so as to adjust the data rate. Also, burst period information and burst size information included in the transmission parameter received by the receiving system may be variable instead of being fixed. Furthermore, the receiving system according to the present invention uses known data information, which is inserted in the mobile service data section and, then, transmitted by the transmitting system, so as to perform carrier recovery, timing recovery, frame synchronization recovery, and channel equalization, thereby enhancing the receiving performance.

Referring to FIG. 13, the receiving system includes a demodulator 801, an equalizer 802, a known data detector (or known sequence detector) 803, a signaling information processor 804, a block decoder 805, a data deformatter 806, a RS frame decoder 807, and a mobile service data derandomizer 808. Herein, a null data remover 809, which removes the transmission null data inserted by the transmitting system, may be further included at the output end of the mobile service data derandomizer 808. Furthermore, the receiving system also includes a data deinterleaver 810, a RS decoder 811, and a main service data derandomizer 812.

More specifically, a frequency of a particular channel received through a tuner (not shown) is down-converted to an intermediate frequency (IF) signal. Then, the tuner outputs the down-converted IF signal to the demodulator 801 and the known sequence detector 803. The demodulator 801 performs self gain control, carrier recovery, and timing recovery processes on the inputted IF signal, thereby modifying the IF signal to a baseband signal. Then, the demodulator 801 outputs the modified signal to the equalizer 802 and the known sequence detector 803. The equalizer 802 compensates the distortion of the channel included in the demodulated signal and then outputs the error-compensated signal to the block decoder 805.

At this point, the known sequence detector 803 detects the known sequence place inserted by the transmitting end from the input/output data of the demodulator 801 (i.e., the data prior to the demodulation process or the data after the demodulation process). Thereafter, the place information (or position indicator) along with the symbol sequence of the known data, which are generated from the detected place, is outputted to the demodulator 801 and the equalizer 802. Also, the known sequence detector 803 outputs a set of information to the block decoder 805. This set of information is used to allow the block decoder 805 of the receiving system to identify the mobile service data that are processed with additional encoding from the transmitting system and the main service data that are not processed with additional encoding.

In addition, although the connection status is not shown in FIG. 13, the information detected from the known sequence detector 803 may be used throughout the entire receiving system and may also be used in the data deformatter 806 and the RS frame decoder 807. The demodulator 801 uses the known data (or sequence) position indicator and the known data symbol sequence during the timing and/or carrier recovery, thereby enhancing the demodulating performance. Similarly, the equalizer 802 uses the known sequence position indicator and the known data symbol sequence so as to enhance the equalizing performance. Moreover, the decoding result of the block decoder 805 may be fed-back to the equalizer 802, thereby enhancing the equalizing performance.

Meanwhile, if the data being inputted to the block decoder 805 after being channel equalized from the equalizer 802 correspond to the mobile service data having additional encoding and trellis encoding performed thereon by the transmitting system, trellis decoding and additional decoding processes are performed on the inputted data as inverse processes of the transmitting system. Alternatively, if the data being inputted to the block decoder 805 correspond to the main service data having only trellis encoding performed thereon, and not the additional encoding, only the trellis decoding process is performed on the inputted data as the inverse process of the transmitting system. The data group decoded by the block decoder 805 is inputted to the data deformatter 806, and the main service data packet is inputted to the data deinterleaver 810.

More specifically, if the inputted data correspond to the main service data, the block decoder 805 performs Viterbi decoding on the inputted data so as to output a hard decision value or to perform a hard-decision on a soft decision value, thereby outputting the result. Meanwhile, if the inputted data correspond to the mobile service data, the block decoder 805 outputs a hard decision value or a soft decision value with respect to the inputted mobile service data. In other words, if the inputted data correspond to the mobile service data, the block decoder 805 performs a decoding process on the data encoded by the block processor and trellis encoding module of the transmitting system.

At this point, the RS frame encoder of the pre-processor included in the transmitting system may be viewed as an external code. And, the block processor and the trellis encoder may be viewed as an internal code. In order to maximize the performance of the external code when decoding such concatenated codes, the decoder of the internal code should output a soft decision value. Therefore, the block decoder 805 may output a hard decision value on the mobile service data. However, when required, it may be more preferable for the block decoder 805 to output a soft decision value.

Meanwhile, the data deinterleaver 810, the RS decoder 811, and the main service data derandomizer 812 are blocks required for receiving the main service data. Therefore, the above-mentioned blocks may not be required in the structure of a receiving system that only receives the mobile service data. The data deinterleaver 810 performs an inverse process of the data interleaves included in the transmitting system. In other words, the data deinterleaver 810 deinterleaves the main service data outputted from the block decoder 805 and outputs the deinterleaved main service data to the RS decoder 811. The RS decoder 811 performs a systematic RS decoding process on the deinterleaved data and outputs the processed data to the main service data derandomizer 812. The main service data derandomizer 812 receives the output of the RS decoder 811 and generates a pseudo random data byte identical to that of the randomizer included in the transmitting system. Thereafter, the main service data derandomizer 812 performs a bitwise exclusive OR (XOR) operation on the generated pseudo random data byte, thereby inserting the MPEG synchronization bytes to the beginning of each packet so as to output the data in 188-byte main service data packet units.

Meanwhile, the data being outputted from the block decoder 805 to the data deformatter 806 are inputted in the form of a data group. The data deformatter 806 removes the known data, trellis initialization data, and MPEG header that were inserted in the main service data and data group. The data deformatter 806 also removes the RS parity that was added by the RS encoder/non-systematic RS encoder or the non-systematic RS encoder of the transmitting system. Thereafter, the processed data are outputted to the RS frame decoder 807. More specifically, the RS frame decoder 807 receives only the RS encoded and/or CRC encoded mobile service data that are transmitted from the data deformatter 806.

Meanwhile, since the signaling information processor 804 may know the configuration of the inputted data group, the signaling information processor 804 extracts transmission parameters, which includes burst size information and burst period information, from the signaling information included in the data group that is outputted from the equalizer 802 or the block decoder 803. Thereafter, the signaling information processor 804 provides the extracted transmission parameter to the corresponding block requiring the particular transmission parameter. When the power is turned on only during the burst section so as to receive the mobile service, information such as the burst size information and the burst period information within the transmission parameters are also provided to a block controlling power supply (not shown).

The RS frame decoder 807 performs an inverse process of the RS frame encoder included in the transmitting system so as to correct the error within the RS frame. Then, the RS frame decoder 807 adds the 1-byte MPEG synchronization service data packet, which had been removed during the RS frame encoding process, to the error-corrected mobile service data packet. Thereafter, the processed data packet is outputted to the mobile service data derandomizer 808. The mobile service data derandomizer 808 performs a derandomizing process, which corresponds to the inverse process of the randomizer included in the transmitting system, on the received mobile service data. Thereafter, the derandomized data are outputted, thereby obtaining the mobile service data transmitted from the transmitting system. At this point, if the transmission null data inserted by the transmitting system exist within the received data, the null data remover 809 removes (or discards) the transmission null data, so that only the mobile service data can be outputted. The null data remover 809 may also be included in the A/V decoder, which recovers the compression encoded mobile service data to the initial state prior to being processed with compression encoding.

As described above, the digital broadcasting system and method of processing data according to the present invention have the following advantages. More specifically, the digital broadcasting system and data processing method according to the present invention is robust against (or resistant to) any error that may occur when transmitting mobile service data through a channel. And, the present invention is also highly compatible to the conventional system. Moreover, the present invention may also receive the mobile service data without any error even in channels having severe ghost effect and noise.

Additionally, by performing error correction encoding and error detection encoding processes on the mobile service data and transmitting the processed data, the present invention may provide robustness to the mobile service data, thereby enabling the data to effectively respond to the frequent change in channels. Also, when the present invention multiplexes the main service data and the mobile service data in a burst structure, a relative position of a main service data packet is re-adjusted and then multiplexed, thereby mitigating packet jitter, which may occur when the receiving system receives the multiplexed main service data packet.

Moreover, when a difference occurs between an output data rate of a service multiplexer and a transmission data rate of a transmitter, the transmitter of the present invention temporarily adjusts the transmission parameters so as to match (or put in accord) the data rates, thereby facilitating the adjustment of the data rates. Furthermore, the present invention is even more effective when applied to mobile and portable receivers, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing data in a broadcast transmitter, the method comprising:
  performing, by a pre-processor, first encoding on broadcast service data, wherein the first encoding is performed by one of error correction encoding and error detection encoding and wherein Cyclic Redundancy Check (CRC) encoding is applied as the error detection encoding;

performing, by the pre-processor, second encoding on the first encoded broadcast service data at a code rate of a plurality of code rates;

performing, by the pre-processor, encoding on transmission parameters at a code rate of the plurality of code rates, wherein the transmission parameters include information for the first encoding and the second encoding;

mapping the second encoded broadcast service data and the encoded transmission parameters into data units; and transmitting data of the data units, wherein the transmission parameters further include information related to the data units.

2. The method of claim 1, wherein each of the data units is composed of a first region, a second region, and a third region, wherein the second region is positioned between the first region and the third region, wherein known data are transmitted in the second region, and wherein the known data are used for frequency synchronization and frame synchronization in a broadcast receiver.

3. The method of claim 1, further comprising:
randomizing the broadcast service data.

4. The method of claim 2, wherein the known data are spaced regularly into the second region.

5. A broadcast transmitter for processing data, the broadcast transmitter comprising:

a pre-processor for performing first encoding on broadcast service data, wherein the first encoding is performed by one of error correction encoding and error detection encoding and wherein Cyclic Redundancy Check (CRC) encoding is applied as the error detection encoding, performing second encoding on the first encoded broadcast service data at a code rate of a plurality of code rates, performing encoding on transmission parameters at a code rate of the plurality of code rates, wherein the transmission parameters include information for the first encoding and the second encoding, and mapping the second encoded broadcast service data and the encoded transmission parameters into data units; and a transmitting unit for transmitting data of the data units, wherein the transmission parameters further include information related to data units.

6. The broadcast transmitter of claim 5, wherein each of the data units is composed of a first region, a second region, and a third region, wherein the second region is positioned between the first region and the third region, wherein known data are transmitted in the second region, and wherein the known data are used for frequency synchronization and frame synchronization in a broadcast receiver.

7. The broadcast transmitter of claim 5, wherein the pre-processor further randomizes the broadcast service data.

8. The broadcast transmitter of claim 6, wherein the known data are spaced regularly into the second region.

* * * * *